(12) United States Patent
Andersen et al.

(10) Patent No.: US 8,190,460 B1
(45) Date of Patent: May 29, 2012

(54) ADVERTISEMENT SALES AND MANAGEMENT SYSTEM

(75) Inventors: Per Skjoldager Andersen, Fredericia (DK); Ove Thorbjørn Jensen, Harlev (DK)

(73) Assignee: CCI Europe A/S, Hojbjerg (DK)

( * ) Notice: Subject to any disclaimer, the term of this patent is extended or adjusted under 35 U.S.C. 154(b) by 1826 days.

(21) Appl. No.: 09/482,462

(22) Filed: Jan. 13, 2000

(30) Foreign Application Priority Data

Mar. 11, 1999 (DK) .................................. 1999 00346

(51) Int. Cl.
*G06Q 10/00* (2012.01)
*G06Q 30/00* (2012.01)

(52) U.S. Cl. .................. 705/7.12; 705/14.72; 705/26.81

(58) Field of Classification Search ................ 705/7.12, 705/14.72, 26.81, 14
See application file for complete search history.

(56) References Cited

U.S. PATENT DOCUMENTS

| | | | |
|---|---|---|---|
| 5,655,130 | A | 8/1997 | Dodge et al. |
| 5,666,543 | A | 9/1997 | Gartland |
| 5,809,317 | A | 9/1998 | Kogan et al. |
| 5,920,861 | A | 7/1999 | Hall et al. |
| 6,253,188 | B1 * | 6/2001 | Witek et al. ..................... 705/14 |
| 6,282,515 | B1 * | 8/2001 | Speicher .......................... 705/14 |

FOREIGN PATENT DOCUMENTS

| | | |
|---|---|---|
| GB | 2258065 A | 1/1993 |
| WO | WO 9513587 | 5/1995 |
| WO | WO 9858334 | 12/1998 |

OTHER PUBLICATIONS

"NEXPO '97, Part II: Editorial and advertising systems, other products", Seybold Report on Publishing Systems, vol. 26 issue 22, Aug. 18, 1997: 7(25).*

"QUARK: Quark Publishing System 2.0 to ship with Windows applications and scores of new features", M2 Presswire, Mar. 24, 1998.*
Definition of "several" (adj.), from the online Merriam-Webster's Collegiate Dictionary, a thttp://www.search.eb.com/dictionary, May 14, 2003.*
S. Rathnam et al., "Mudraplan—A DSS for Media Planning: From Design to Utilization," Interfaces 22:2, Mar.-Apr. 1992, pp. 65-75.
G. Moynihan et al., "A Decision Support System for Media Planning," Computers ind. Engng., vol. 29, No. 1-4, pp. 383-386, 1995.
European Examination Report dated Nov. 7, 2005 for European Application No. 00 910 563.6-2211.
Hansen, Hans Robert Hansen, Grundlagen betrieblicher Informationsverarbeitung, Apr. 20, 1998, Lucius & Lucius, Stuttgard, first publication 1996, pp. 11-19.

* cited by examiner

*Primary Examiner* — Donald L. Champagne
(74) *Attorney, Agent, or Firm* — Harness, Dickey & Pierce, P.L.C.

(57) ABSTRACT

An advertisement sales and management system comprising data storage means, data retrieval means, data processing means, database means, and a number of workstations, performing the tasks of: entering advertisement orders, entering advertisement associated-data, and entering customer associated-data. The database means and the data processing means storing and managing data relating to customers, an advertisement order comprising data related to a group of related advertisements including: a medium in which the advertisement is published, schedules defining insertions, contents of advertisements, and presentation elements of respective advertisement. The advertisement sales and management system generating data defining the advertisement based on entered order data, constituting a single system supporting entry, sales and management of advertisements in media, a WYSIWYG editor supporting entering or editing contents and/or presentation elements of the advertisements, and displaying on a screen the contents and presentation elements in the graphical representation defined by the data.

8 Claims, 12 Drawing Sheets

ADVERTISEMENT SALES AND MANAGEMENT SYSTEM

FIELD OF THE INVENTION

The present invention relates to an advertisement sales and management system and method that provide a comprehensive advertising solution which supports the integration of the total advertising workflow by handling all kinds of advertisements booked for one or multiple media.

The system according to the present invention is capable of providing significant cost and time efficiencies in the entry, sales, production and management of advertisements.

BACKGROUND OF THE INVENTION

Advertisement sales and management systems have traditionally been based on computer systems and programs that were adapted to handle advertisements in a specific type of medium such as newspapers. Newspaper advertisements comprise classified advertisements and retail advertisements that are placed on editorial pages of the newspaper as well as inserts in the newspaper.

Accordingly, such prior art advertisement sales and management systems have only been capable of booking and managing e.g. an advertisement order for a single type of media, such as newspapers, magazines or other printed media. A customer wishing to book an advertisement for several differing media, e.g. a particular newspaper, the Internet and at a commercial radio station, would have to administrate the booking procedure through several different contact persons each working on his/hers proprietary advertisement management program and/or computer system.

This booking procedure is, obviously, both complicated and time consuming for the customer since he/she must keep track of when and where the advertisement is to be published in the respective media to secure that for instance an advertisement campaign is properly co-ordinated. Furthermore, the customer must also check and manage invoices for several different suppliers and make certain that volume discount rates, variable discount rates or other special discount rates are properly applied to the advertisement order in each media.

SUMMARY OF THE INVENTION

It is an object of the invention to provide an advertisement sales and management system which is particularly well adapted to requirements of newspaper and magazine publishers, but at the same time may integrate sales and management of advertisements in other media including electronic media.

It is also an object of the invention to provide a single advertisement sales and management system permitting management of several related advertisements in several media based on entry of a single order. In particular, the present system provides the possibility of, on the fly, entry and price calculation of an advertisement order for several differing media, such as printed media and electronic media.

The basic philosophy of the system provided by the present invention has been to provide a solution with a central database means. This database means is surrounded by a number of application programs, proprietary or third party products, designed to support the entire advertising sales and management workflow.

The database means may be used for all advertisement sales and management elements: images, text and graphics and advanced electronic media elements, as well as relevant administrative information such as customer contracts, access rights etc.

DESCRIPTION OF THE INVENTION

A first aspect of the invention relates to an advertisement sales and management system comprising:
data storage means, data retrieval means and data processing means
database means
and a number of workstations,
one or more of the workstations being adapted to perform one or more of the tasks selected from the group consisting of:
entering advertisement orders into the database means,
entering advertisement-associated data into the database means and retrieving advertisement-associated data from the database means,
entering customer-associated data into the database means and retrieving customer-associated data from the database means,
the database means and data processing means being adapted to at least store and manage data relating to
an advertisement customer,
an advertisement order comprising data related to an advertisement or a group of related advertisements, including
a medium or media in which the advertisement or individual advertisement of the group of related advertisements is/are to be published, and
a schedule or schedules defining insertions of the respective advertisements in respective media to control publication of the respective advertisements,
contents of respective advertisements,
presentation elements of respective advertisements,
the advertisement sales and management system being adapted to generate data defining the advertisement or the groups of related advertisements on the basis of entered order data,
the advertisement sales and management system thereby constituting a single system supporting entry, sale and management of several related advertisements in several media based on entry of a single advertisement order.

The several media may comprise several printed media such as newspapers, magazines, and posters, but according to an important embodiment of the present invention, the advertisement sales and management system or advertisement system is also adapted to handle one or more electronic media, preferably together with one or more printed media.

In the present specification and claims, the term "advertisement sales and management" designates all operations which are involved in the entering, selling, defining or creating advertisements in the form of electronic data defining the advertisements within the computer system. The physical production of the advertisements in the respective media will typically be performed using a special production system which may or may not be integrated with the advertisement system of the present invention. However, the fact that the advertisement system according to the invention has, as one of its attractive features, the capability of creating advertisements in multiple media including electronic media such as the Internet makes it possible and advantageous to create the full representation of an advertisement in such a media as a part of entering the advertisement in the system.

Other operations also covered by the term "advertisement sales and management" are a number of administrative tasks such as pricing, accounting, customer contract handling, creating statistics, sales automation, etc. Also, it is within the scope of the system of the invention to enter data representing response to advertisements, such as awareness polls results, the frequency with which an advertisement on the Internet is visited, etc., and to relate such response data to the particulars of the customer or the group of customers, the design and nature of an advertisement campaign, etc.

In the present specification and claims, the term "customer" designates a customer and/or an agency since an advertisement customer in the present context can be the customer himself, e.g. in the form of an authorised employee of the customer, or the customer may be represented by an advertisement agency acting on behalf of the customer.

The computer system used according to the invention may be any suitable conventional or proprietary computer system. Preferably, a client/server architecture is utilised for the above-mentioned individual elements of the computer system. This architecture reduces the load on the database and guarantees a quick response time for the end users or operators. The client workstations are, preferably, personal computers (PCs) which, preferably, run a Windows NT operating system.

The database means of the advertisement system is to be understood as a database in the broadest sense of this term, since a database is basically a collection of data or information which has been organized for ease of search and retrieval; thus the database means may comprise a flatfile database structure, a relational database structure, an object oriented database structure or any suitable combination thereof for the organisation of advertisement data or information.

Individual components of the database means may be provided in close physical proximity of each other, e.g. one of several servers located in the same or adjacent rooms or, alternatively, be provided in a fragmented structure where the individual components are in communication with each other over a public or proprietary computer network.

It is presently preferred to implement the computer system as a client/server relational database with data object facilities. The database program as well as entered/created advertisement data may be stored in one or more hard-disc drives comprised within the server or server means and loaded into RAM memory of the server means during program execution.

As an example, the database means of the advertisement system may be an Oracle SQL database running on a server or servers of the computer system, preferably an AIX or UNIX server(s) provided with mirrored disks. This database may comprise all advertising booking, selling, production and administrative information.

One or more of the workstations of the computer system is/are adapted to perform one or more of the tasks: entering advertisement orders into the database means, entering advertisement-associated data into the database means and retrieving advertisement-associated data from the database means, entering customer-associated data into the database means and retrieving customer-associated data from the database.

When a customer for the first time places an advertisement order in the present advertisement system, data associated with this customer may be entered into the system. Typically, this data may comprise customer specific data, such as name, customer ID, address of residence, associated subsidiaries or, alternatively, head office information, etc. Furthermore, customers and/or agencies registered in the system are preferably related to one or more account records which include financial information such as terms of payment, credit limits, etc. A customer may have more accounts if it has different financial terms for different activities. The next time the same customer wants to place an advertisement order in the system, a workstation operator is able to retrieve customer-associated data from the database to locate relevant information about the customer in question. This data retrieval may be provided by a software module that provides extensive search functionality to the workstation operator so that any required customer information may be retrieved and displayed.

The advertisement orders that can be entered into the system may comprise a rather comprehensive structure, defining an advertisement or a group of related advertisements. In the present specification and claims, the term "advertisement" may be any type of advertisement, published in electronic or printed format, offering a service or product to the public. "A group of related advertisements" designate a group of advertisements that substantially have the same form with respect to contents and meaning, but wherein each advertisement may be adapted to publication in a particular medium.

The present invention supports an advertisement order concept that facilitates management of a group of related advertisements which include electronic advertisements for publication on e.g. the Internet, television and radio fully integrated with the management of traditional newspaper classified and retail advertisements. Accordingly, advertisement order data comprise data related to the medium or media in which the advertisement or the individual advertisements of the group of related advertisements is/are to appear. Each advertisement entered into the advertisement system is further provided with data related to a schedule or schedules defining insertions of the advertisement to control publications of the advertisement. The schedule data stored in the present advertisement sales and management system accordingly define one or more insertions of the respective advertisements in the respective media. Preferably, schedule data are provided for each species of the media that is associated with a particular advertisement. As an example, an order for a newspaper advertisement may be entered into the advertisement system and these order data may comprise several schedules, each schedule defining any number of insertions of the advertisement in e.g. a particular newspaper.

In the present specification and claims, the term "contents of respective advertisements" designates the media-independent information contents of the advertisement. In the case of printed media, the contents of the advertisement comprise the meaning or the message including pure textual contents e.g. the words, letters, signs, numbers and artwork as such, independent of presentation elements. For text presentation elements typically comprise: font, font-size, borders, bolding or other graphical elements typically associated with the text. Other presentation elements are: the size of the advertisement in a printed medium, typeface, co-ordinates for placement of text, relative positions between graphical information elements, colour of graphical information elements or parts thereof, borders, shading and three-dimensional effects.

The term "contents" also designates graphical information elements that often provide meaning and message to the advertisement, such as logos, company logos, animations, pictures, videos and other message- or meaning related elements.

As indicated above, the term "presentation elements" designates substantially typographical/graphical parameters that define the visual and/or audible appearance of the contents of the advertisement when published. For printed media, these elements will typically be selected from: the size of the advertisement, typeface or font, font size, coordinates for placing text, relative positions between graphical information elements, colour of graphical information elements or parts thereof, borders, shading, three-dimensional effects.

According to a preferred embodiment of the present advertisement system, the database means is capable of storing and managing, based on a single advertisement order, a group of related advertisements each to be published in a particular medium. Each advertisement may have one or several sets of associated schedule data and each set of schedule data may define one or several insertions of the advertisement. The version of an advertisement published in an insertion is identical or non-identical to versions of the advertisement published in other insertions thereof. As an example, each set of three sets of schedule data may be related to publications of the advertisement in three respective newspapers. The insertions of the advertisement in a particular newspaper may all be different, thus consisting of different versions of the advertisement, or they may be identical, i.e. consisting of identical contents and presentation elements and as such constitute a particular version of the advertisement. This particular version of the advertisement could subsequently be published as four insertions in four consecutive daily newspaper editions in accordance with the schedule defining the insertions.

The database means of the computer system is capable of storing the advertisement data in a manner which makes it possible for the database means to accommodate the above-described structure of an advertisement order. The structure of the advertisement order can be directly reflected in the manner in which the database means is designed, with a hierarchical structure established by means of data pointers between records such as shown in FIG. 2. It will be understood that the said order structure may be implemented in a number of ways such as establishing the hierarchical data structure shown by adaptation of a suitable relational database. It will also be understood that the order structure could equally well be represented in an object database or in a configuration database. The important issue is that the database means is capable of storing and managing, optionally together with the data processing means, the data structure required by the most complex order structure envisaged.

The database and the data processing means may be adapted to create versions of an advertisement on the basis of database data comprising contents of the advertisement and presentation elements of the advertisement. In this situation, consecutive newspaper editions may contain different versions of the same advertisement so that e.g. each of the above-mentioned four consecutive daily newspaper editions would contain a unique version of the same advertisement. However, since each version of the advertisement may be built by selecting suitable contents and presentation elements from the advertisement data of the database there is no need to define a completely new advertisement for each unique version of the advertisement. Consequently, each version of the advertisement may be created by selecting appropriate elements from the database, and thus resource-demanding data duplication is avoided. Furthermore, since redundant information (i.e. data duplication) is avoided by using a single database for holding all advertisement data, the time spent on maintenance of the system is significantly reduced. Another advantage is that advertisement data are not fragmented but linked to a single point so that updates or editions to e.g. the contents of a particular advertisement may be effected across multiple media and even in multiple versions by edition of just a single or few database elements. Consequently, the operator's task of managing complex advertisement orders that may contain a multitude of related advertisements and even several versions of each advertisement is significantly simplified and thus less time consuming and less vulnerable to errors.

The media may, as presently important examples, be selected from the group consisting of: newspapers, magazines, paper or electronic books, electronic newspapers, electronic magazines, news streamers, running message displays, news-banners, TV, movies, data carriers such as CD ROMs, DVD discs, magnetic discs, DAT tapes, videos, radio, stationary telephones, mobile (cellular) telephones, teletext, public networks, including the Internet, inserts, onserts, and posters. Accordingly, the present system may be capable of managing a customer's and/or agency's advertisement order which relates to any of these printed or electronic media or any combination thereof.

Preferably, a number of attributes are stored in the database and associated with the data defining each insertion, the attributes comprise attributes selected from the group consisting of: title of a specific species of the medium, zone of the specific species of the medium, section/classification of the particular species of the medium, the version of the advertisement, as defined by contents and presentation element data, time- and/or event-related data for the publication of the advertisement. Accordingly, these attributes are associated with the publication of the advertisement in a particular medium, and a set of attributes which is meaningful in the context of a specific medium is preferably defined. As an example, attributes related to the section, page number and classification may only be of relevance for newspapers or for magazines but not for Internet publication of the advertisement; on the other hand, an attribute relevant to Internet publication is, e.g., the number of visits for which an Internet advertisement is to be maintained.

According to a preferred embodiment of the invention, price data are stored in the database means so that they are relatable to advertisement data selected from the group consisting of: the physical presentation of the advertisement established on the basis of the contents and the presentation elements of the advertisement, insertion data/attributes, schedule data, media data, customer data, and order structure, thus enabling calculation of the price of an order when the order has been fully defined. Furthermore, the customer data may comprise information about specific customer contracts. Accordingly, the system may calculate the price of an advertisement or a group of related advertisements based on customer price agreements.

The above-mentioned considerations demonstrate that the present system can handle the complex structure of parameters that often influence the price of an advertisement. The parameters that influence the pricing of advertisements may be related to the individual customer, the contract or contracts, the classification, the rate structure of the newspaper and/or other media and the special discount or rebate structure of the individual customer. Furthermore, the price of the advertisement will often vary according to the advertisement type, the size of the advertisement, the package for which the advertisement is booked, the insertion schedule or schedules of the advertisement, special requests for page and position, colour usage, amount of special build up to be performed, use of logos, images and graphics as well as other properties assigned to the advertisement.

A customer can be part of a group of customers and/or agencies. The relations between e.g. the customers and/or agencies within a group are preferably reflected in the database in a many-layered hierarchy. The hierarchy can be used for representing the relations between, e.g. corporate offices, subsidiaries and branch offices and thereby ensure that the advertisement sales and management system is capable of correctly applying e.g. contracted discount rates to individual customers and/or agencies with highly complex relationships to other customer and/or agencies represented within the system.

According to another preferred embodiment of the invention, the calculation and display of the price of an order is performed dynamically during establishment of the order, a price displayed on the display of a workstation reflecting the aspects of the order which have been defined or which are being defined. This dynamic price display during building of the advertisement may be enabled by transferring entered and/or created advertisement-associated information and customer data, such as word and line count, use of logos, use of frames, use of colour, customer ID, etc. to a program or a module operating as a pricing engine. This pricing engine may, based on the above-mentioned data, dynamically calculate a current price for the advertisement under creation. By displaying this cost information on the operator's screen, the operator will be able to continuously inform the customer about the current cost of an advertisement. This pricing engine may be running on the server means or alternatively, on one or more of the client workstations.

The entry or editing of graphical advertisement contents and presentation elements in the database is preferably supported by including a WYSIWYG editor adapted to support entering or editing contents and/or presentation elements of the advertisements. This WYSIWYG editor is furthermore adapted to display, on a screen of at least one workstation of the system, the contents and presentation elements in the graphical representation defined by the data.

This WYSIWYG editor is first of all a fast and efficient tool for creating and/or editing complete lineage advertisements or semi-display advertisements or for writing text blocks that may be passed on to an associated production system and used in the advertisement make-up process. The WYSIWYG editor may have access to a number of predefined advertisement templates (standard advertisements) as well as graphical presentation elements that can be used as the basis for fast creation or building of advertisements. Accordingly, the WYSIWYG editor may allow on the fly completion of some types of advertisements, such as classified lineage advertisements, semi-display advertisements, etc.

In another preferred embodiment of the invention, the system comprises data transfer means, such as address pointers, serial or parallel databuses, public telephone networks, LANs, WANs, public networks including the Internet for communicating advertisement data from the database to a file, file system or database means associated with an advertisement planning and/or production system. Preferably, an advertisement planning and production system is tightly integrated with the present advertisement sales and management system. Furthermore, other software modules may also be used in the environment such as editorial systems, fax, electronic funds transfer, automatic call distribution (ACD), archive, etc. Standard APIs and integration tools may also be provided in order to facilitate such integration tasks for the integration of any other third party products.

According to a preferred embodiment of the invention, the data stored and managed by the database means comprise user interface data defining a graphical user interface (GUI) and/or other function parameters of an individual workstation or individual workstations, and/or the data model used from an individual workstation or individual workstations in the computer system. Accordingly, the present advertisement sales and management system may permit an individual users, or a particular group of users having a specific task in the advertisement workflow, to work with a customised user interface so that this individual user, or group of users, are provided with a highly specialised GUI that reflects his/hers role or roles in the advertisement workflow process.

With respect to the graphical user interface, a preferred implementation thereof can be as follows:
The overall split of the advertisement sales and management system in layout, functionality and database access is preferably made by the use the following guidelines:
Layout of the graphical user interface (GUI) may be placed in description files
Clean interface between the GUI and the functionality
Easy access to the database
Database consistency placed in the database access layer
Reference is made to FIG. 3 which illustrates this three layer architecture.

According to a preferred embodiment of the invention, a Virtual GUI Interface has been implemented that does not contain layout or format information. The Virtual GUI Interface contains fields with values, lists, commands and events. The GUI Engine translates commands received from the Virtual GUI Interface to a specific layout on the operator's workstation display in a dialog with buttons, menu items, shortcuts and fields with formats.

The database access handles:
Fetching and updating the database
Translation of links to foreign keys
All consistency checks
Access rights and overall access security are preferably handled in a manner where access profiles are specified based on for instance:
User group
User role
Personal set-up
This will provide the ability to restrict and grant access to application units and areas of the system based on the specific requirements of a given workstation user or operator.

According to a preferred embodiment of the present invention, the system comprises a number of applications, such as about 20 applications. Each application supports an operator of the present advertisement sales and management system in a given workflow process, e.g. an user handling the entry of the advertisement orders may have an Advertisement Order Entry application running at his/hers workstation while an given the task of contract maintenance may solely have a Contract application running.

With this definition of an application, more applications will contain shared functionality. Therefore, applications are preferably divided into application units as illustrated in FIG. 3.

The main reasons for defining these application units are:
Reuse of software modules
Low interaction with other Application Units
Reflecting Domain Objects from the analysis
Not too big
Not too small
An example, of a design editor implementing the above-described technology is shown in FIG. 3. The design editor is used for making dialogs between the advertisement sales and management system and the users. The design editor is adapted to read a description of the Virtual GUI Interface (called an application unit description) from the application unit. The description is supplemented with the description of the database (data dictionary).

Accordingly, the data stored and managed by the database means may also comprise user interface data defining a graphical user interface and/or other function parameters of an individual workstation or a group of workstations, and/or the data model used from an individual workstation or the group of workstations in the computer system. Furthermore, these user interface data may be related to a target media for the advertisement or advertisements being entered, sold or otherwise managed, and/or to a task of a workstation operator, and/or access rights of the operator. Preferably, the access rights and/or the graphical user interface which are/is granted to individual workstation operators in the system reflects the role of the operator in the advertisement sales and management workflow. As an example, an operator given the task of creating and entering classified semi-display advertisements into the system may not have access rights to database data associated with certain information elements such as photos, sounds, videos, and animations. The graphical user interface may also reflect these access rights so that only elements that are relevant for the operator in performing his/hers assigned task are displayed on the workstation screen. Preferably, the advertisement sales and management system enables the graphical user interface and/or other function parameters of the individual workstation(s) and/or the data model to be customised to the individual operator without modifying binary code of the computer system. This highly convenient feature allows expert users, such as system administrators, to provide customised e.g. graphical user interfaces per request from the users themselves without having to order, specify and wait for the arrival of such customised applications from the software vendor.

A second aspect of the invention relates to a method of managing advertisements in an advertisement sales and management system which comprises: data storage means, data retrieval means, data processing means and database means and a number of workstations; the method comprising:
performing from one or more of the workstations one or more of the tasks selected from the group consisting of:
entering advertisement orders into the database means,
entering advertisement-associated data into the database means and retrieving advertisement-associated data from the database means,
entering customer-associated data into the database means and retrieving customer-associated data from the database means,
managing and storing by the database means and data processing means data relating to
an advertisement customer,
an advertisement order comprising data related to an advertisement or a group of related advertisements, including
a medium or media in which the advertisement or individual advertisement of the group of related advertisements is/are to be published, and
a schedule or schedules defining insertions of the respective advertisements in respective media to control publication of the respective advertisements,
contents of respective advertisements,
presentation elements of respective advertisements,
generating data defining the advertisement or the groups of related advertisements based of entered order data in the advertisement sales and management system,
the method thereby supporting entry, sale and management of several related advertisements in several media based on entering a single advertisement order.

The data relating to the medium or media in which the advertisement or individual advertisement of the group of related advertisements is/are to be published may comprise data related to both printed media and electronic media.

Preferably, the method furthermore comprises storing and managing one or several versions of the advertisement, the version of an advertisement being identical to or different from other versions of the advertisement as published in the other insertions thereof according to the data related to the schedule or schedules defining insertions of the advertisement.

The method may furthermore comprise the step of associating a material with substantially each insertion of the advertisement, the material comprising:
contents of the insertion of the advertisement
presentation elements of the insertion of the advertisement.

This allows the user to store and manage substantially each insertion of an advertisement through a material data level provided by the association between the material and the substantially each insertion of the advertisement,
the material defining the visual and/or audible appearance of the advertisement when published in a media.

By allowing a user to manage an insertion of an advertisement through the associated material, it is furthermore possible to rapidly create one or several versions of a previously stored advertisement. This is accomplished according to a preferred embodiment of the invention which comprises the further steps of:
retrieving contents and/or presentation elements associated with a previously stored insertion of the advertisement from the database means, creating a version or versions of the previously stored advertisement by editing the retrieved contents and/or presentation elements, and storing the version or versions of the advertisement in the database means as corresponding material or materials.

This retrieval and editing of the previously stored contents and/or presentation elements are preferably performed by editing and displaying in a WYSIWYG editor, on a screen of at least one workstation, the retrieved contents and/or presentation elements associated with the previously stored version of the advertisement. In addition to having access to the, typically, very large amount of previously stored material, the WYSIWYG editor may also have access to a number of predefined advertisement templates (standard advertisements) with a few or many graphical presentation elements. Accordingly, the advertisement sales and management system is capable of providing the user with a plurality of "prefabricated" advertisement "building blocks" which can be used as a basis for fast and efficient creation or building of new advertisements or creating versions of already stored advertisements.

BRIEF DESCRIPTION OF THE DRAWINGS

A preferred embodiment of an advertisement sales and management system is described in the following with reference to the drawings, wherein.

DETAILED DESCRIPTION OF A PREFERRED EMBODIMENT

In the following, a specific embodiment of the invention is discussed in greater detail with reference to the figures and flowcharts. It will be understood, and will be realised by the person skilled in the art, that the invention is not limited to this embodiment, and that the individual modules described in this could be implemented in many other ways, or that some of the modules could be dispensed with or be replaced with other modules.

Figure 1:
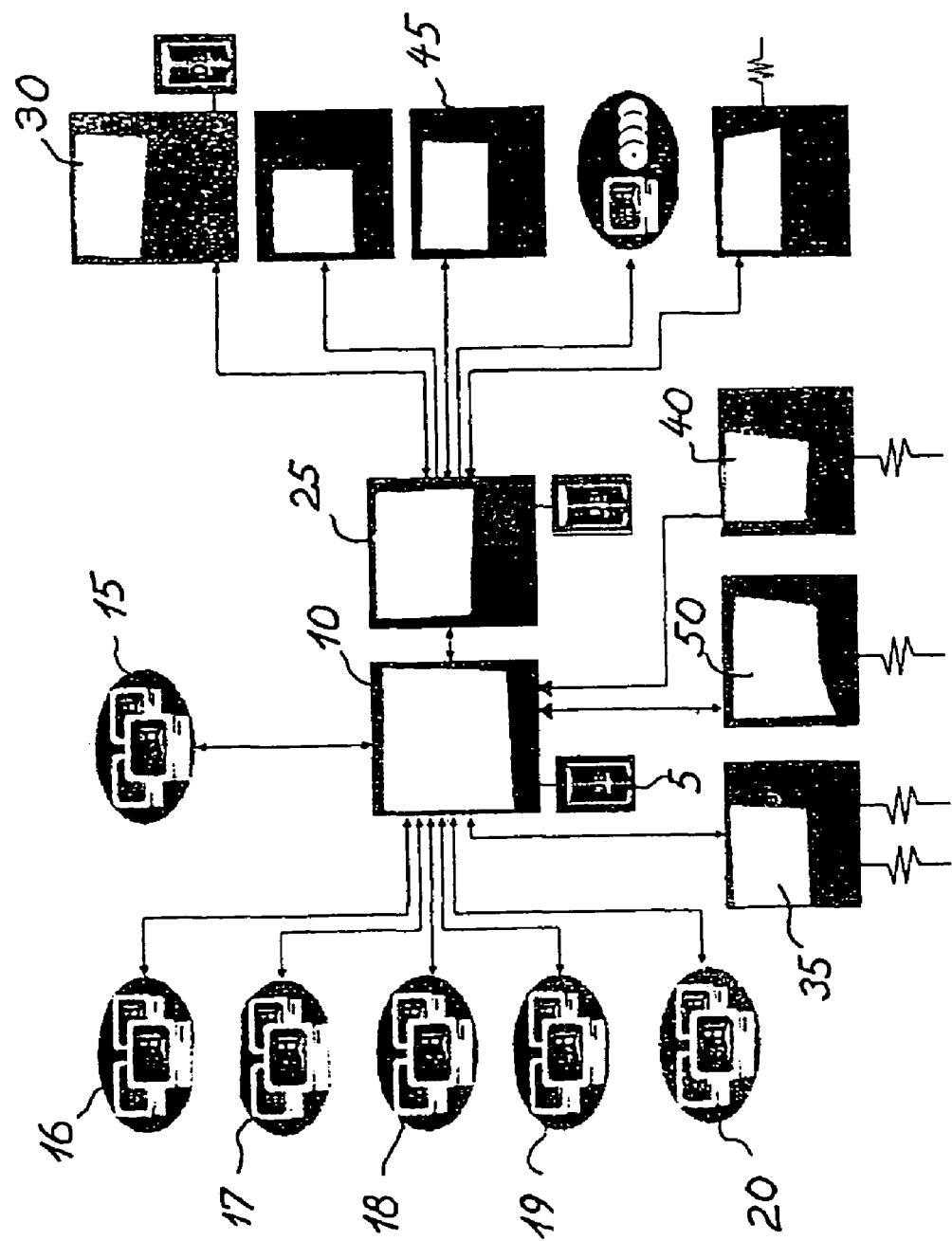
FIG. 1 illustrates various elements comprised in the advertisement sales and management system according to the present invention and an associated advertisement production system, FIG. 2 of the drawings illustrates an example order structure and the corresponding database structure.

FIG. 1 shows an advertisement sales and management system according to a preferred embodiment of the present invention. The system is based on an open architecture running in a client/server environment. This architecture reduces the load on an advertisement database 5 and guarantees a quick response time for the end users or operators.

The core of the system may be an Oracle SQL database running on high availability AIX or UNIX servers 10 with mirrored disks. The database 5 may comprise all advertising booking, selling, production and administrative information.

Client workstations 15, 16, 17, 18, 19, 20 are, preferably, personal computers (PCs) running operating systems such as Windows NT, Windows 95, Windows 98, Linux, etc. From a client workstation the operator is preferably capable of accessing all relevant applications (i.e. a single footprint environment) in the present advertisement system. It is presently preferred that the client workstations 15-20 are using Windows NT as an operating system, which provides the users with access to a variety of standard desktop applications such as e-mail, web browser, calendars, etc.

All hardware and software utilised in the system are operating according to respective industry de facto standards, such as UNIX servers from IBM and Sun Microsystems, Oracle SQL database, and Windows NT PCs. Software modules implementing the present system are, preferably, written in C and C++ or Java, and have graphical user interfaces based on industry standards such as Windows NT. Standard APIs and integration tools are, preferably, provided for the integration of third party applications. This allows the use of, e.g. existing third party web solutions that may be tightly integrated to any existing systems providing a powerful supplement to these systems.

The system comprises a number of software modules or program modules or applications that each implement a specific function or functions in the present advertisement sales and management system. The function of these software modules is explained and described in the following with respect to a creation of an advertisement order.

The advertisement order entry module plays an important role in the present system. This module may be running on one or more Windows NT client workstations 15-20 as shown on FIG. 1 where the order entry runs on workstations 16, 17. The order entry module will define the basic characteristics of an advertisement booking including, e.g., in which media the advertisement will be published, when it will be published and its visual and/or audible appearance. Accordingly, the order entry module enables an operator at the client workstations 16, 17 to book both classified and retail advertisements for any type of media or combination of media and as such provides a single booking procedure for simultaneously booking of an advertisement in several media.

Figure 2:
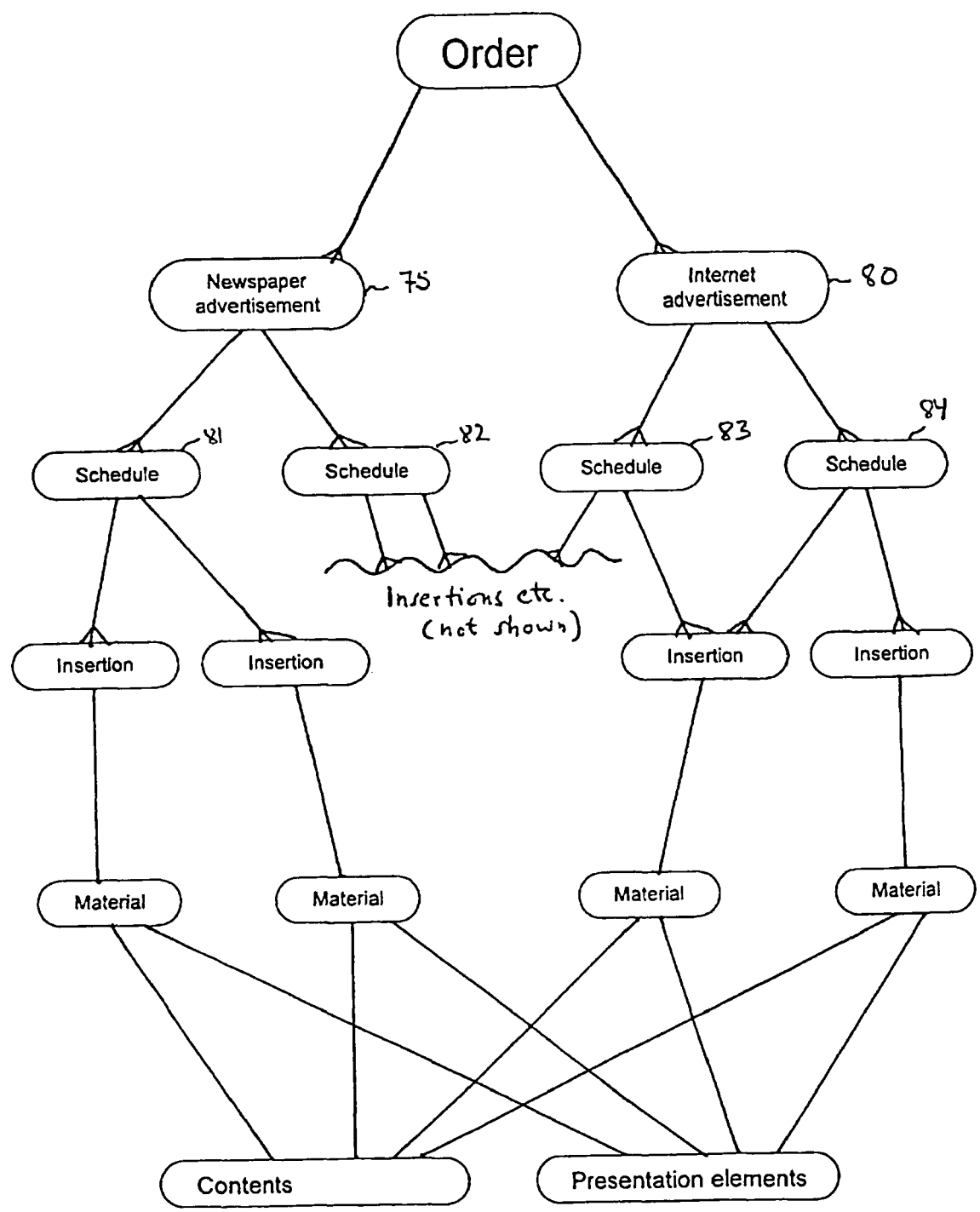

The order structure illustrated in FIG. 2 comprises two related advertisements, a newspaper advertisement 75 and an Internet advertisement 80. It will be seen that each of the advertisements has a number of schedules related thereto 81-84, each schedule being associated with a number of insertions (some of the insertions and the lower-hierarchical data are not shown). Each insertion has a "material" related thereto, either as shown through a "material" level of data which in turn is associated with advertisement contents and advertisement presentation elements, or (as not shown) by direct relation between the insertion data level and the contents and presentation elements level. Each insertion has a number of attributes which are relevant to the media in question. As an example, a newspaper advertisement may have at least the following attributes:

| Newspaper Title | Classification | Publication | Zone | Publication date |
|---|---|---|---|---|

An Internet advertisement may have at least the following attributes:

| Organization or Home Page | Subdivision | Publication period | Publication date, Last; or number of exposures/visits |
|---|---|---|---|

It will be understood that the database will also, in most embodiments, comprise a number of additional attributes or associated data at various data levels; one prominent example is constituted by price-related data which are associated at most or all levels.

An exemplary advertisement booking procedure that creates an advertisement order will be described in the following with reference to the flow sheets on FIGS. 4-12. The illustrated advertisement booking creates two related advertisements, a printed newspaper advertisement and an electronic Internet advertisement.

Figure 5:
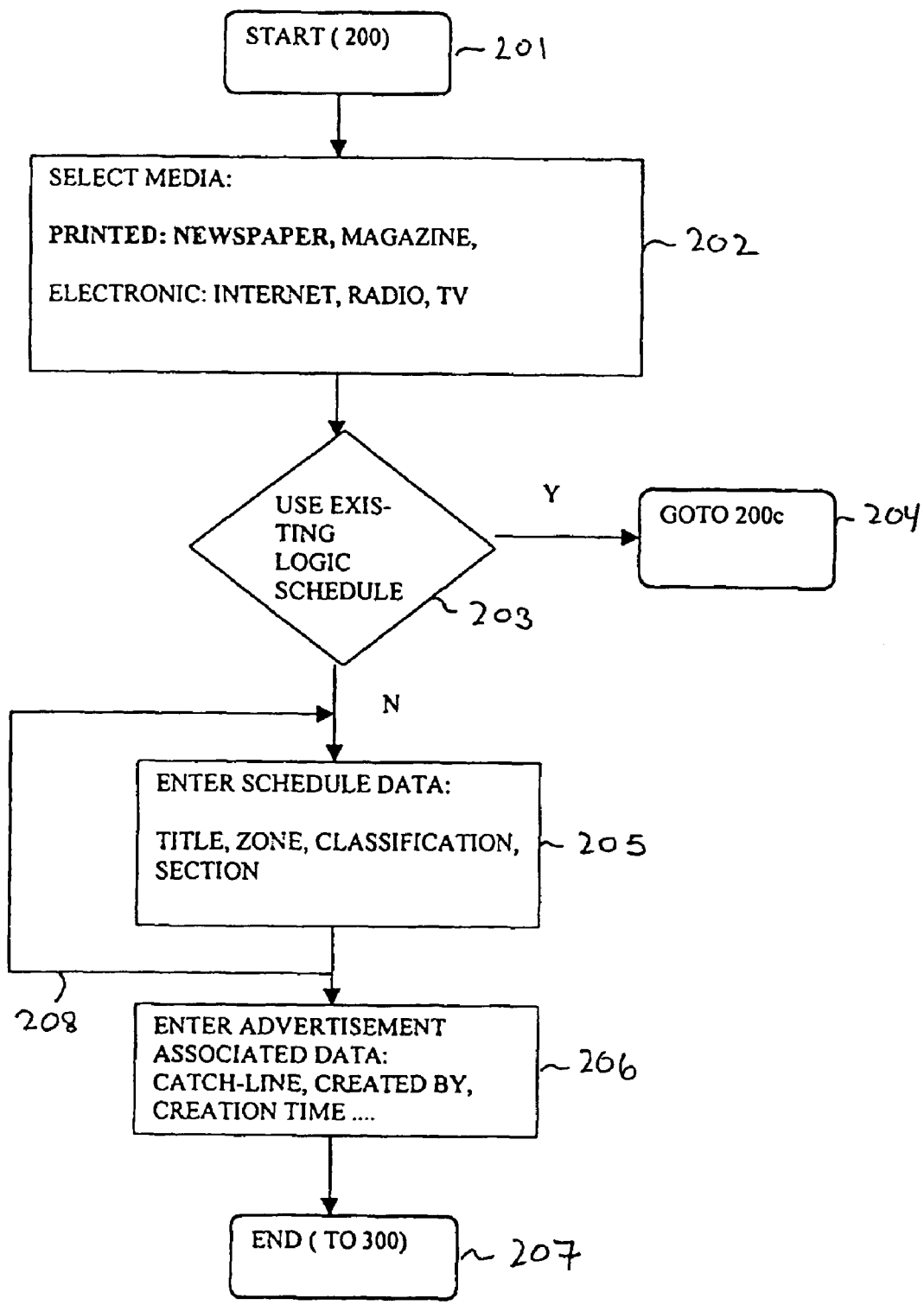
FIGS. 5-12 are more detailed flowcharts describing in detail each of the five processes of the advertisement order entry/creation process of FIG. 4.
Figure 6:
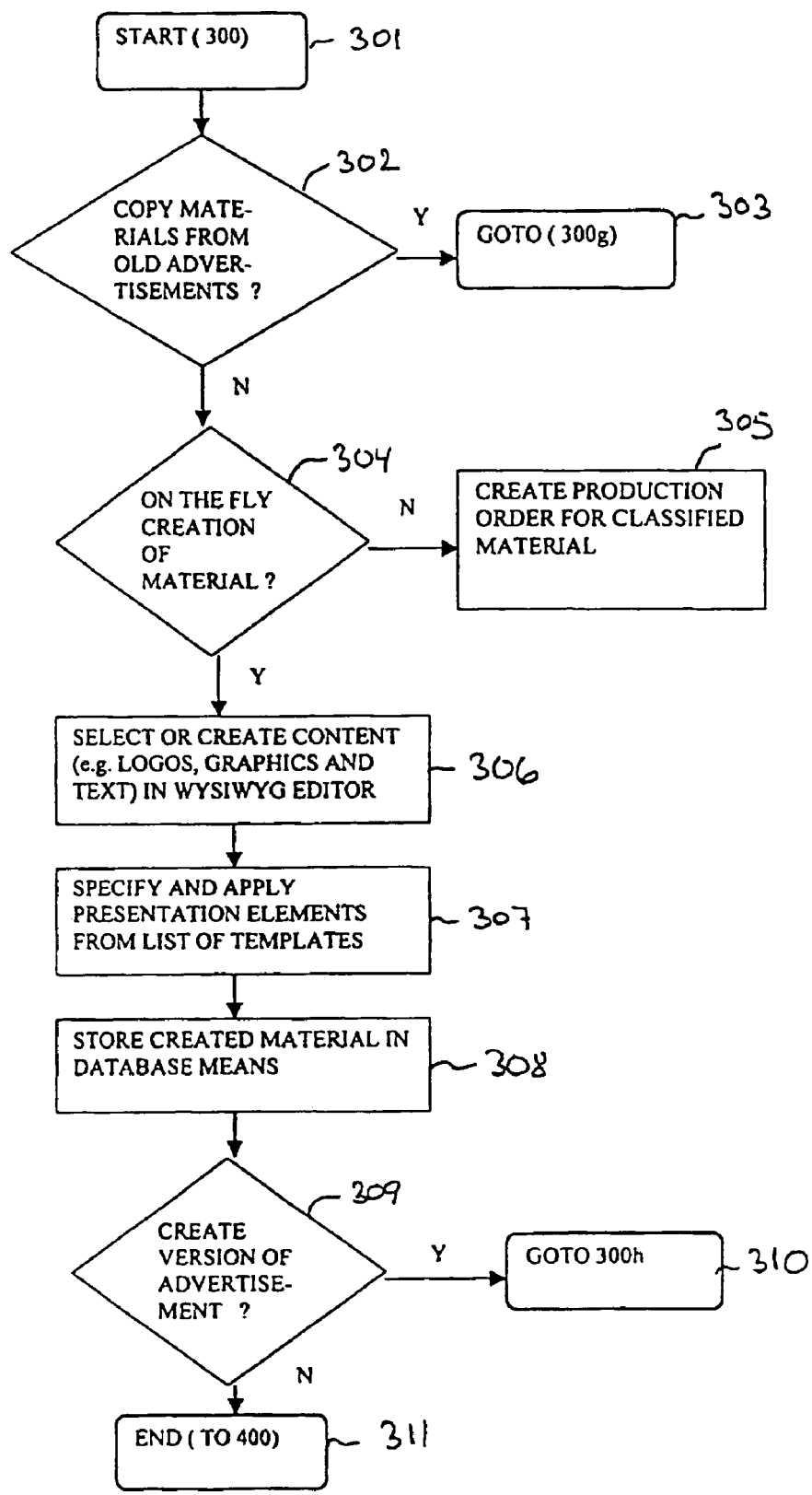
Figure 7:
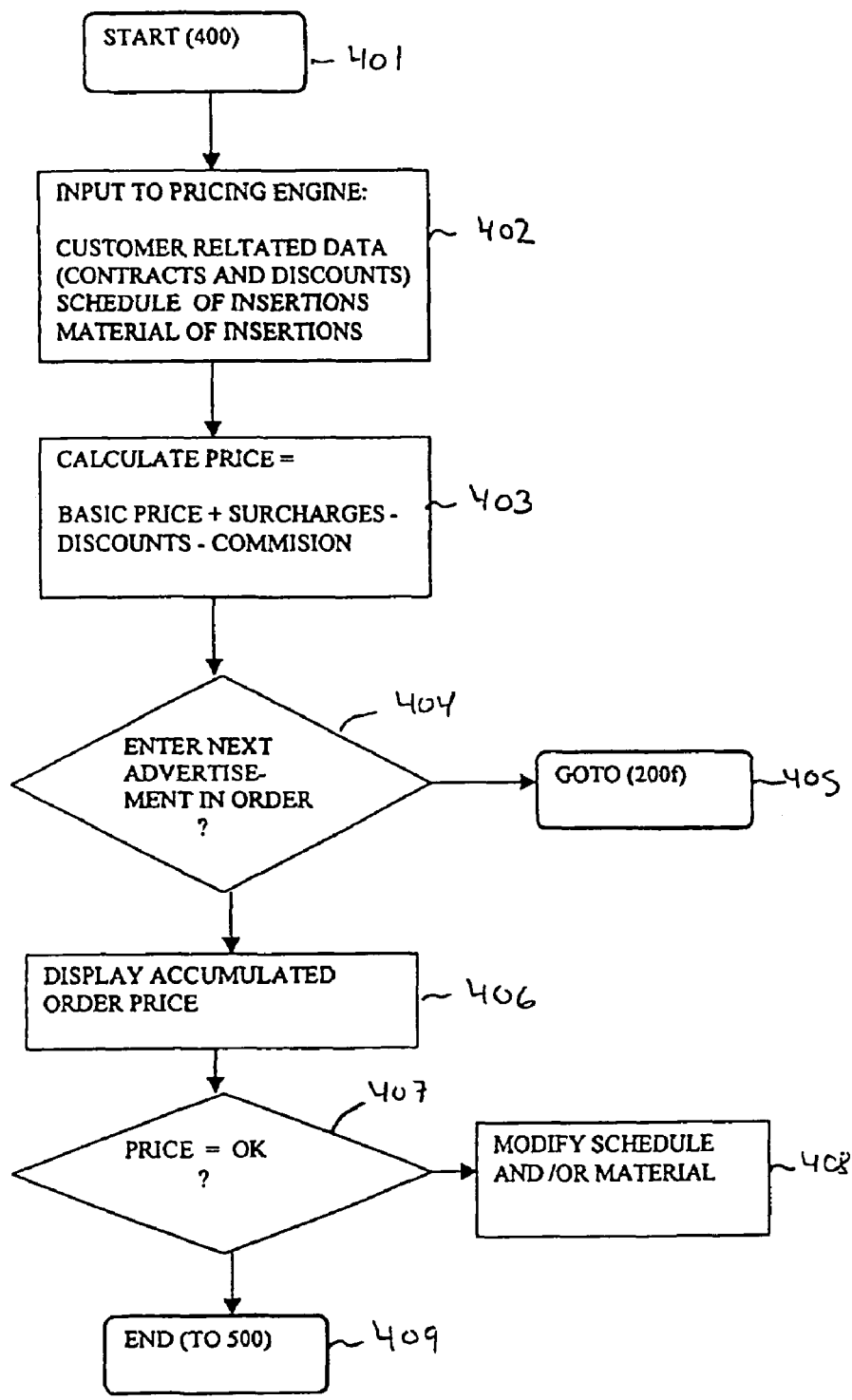
Figure 8:
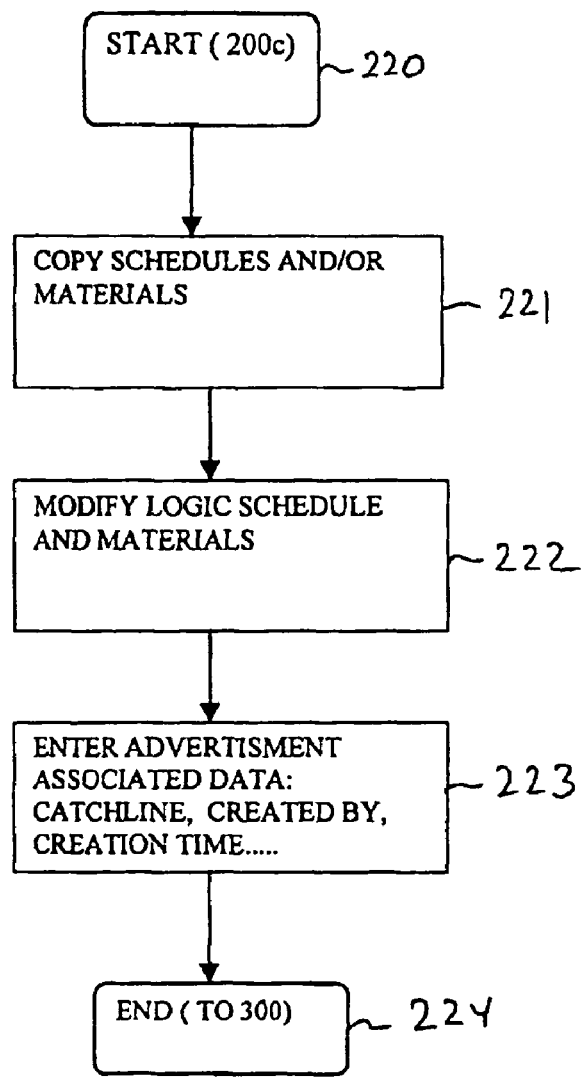
Figure 9:
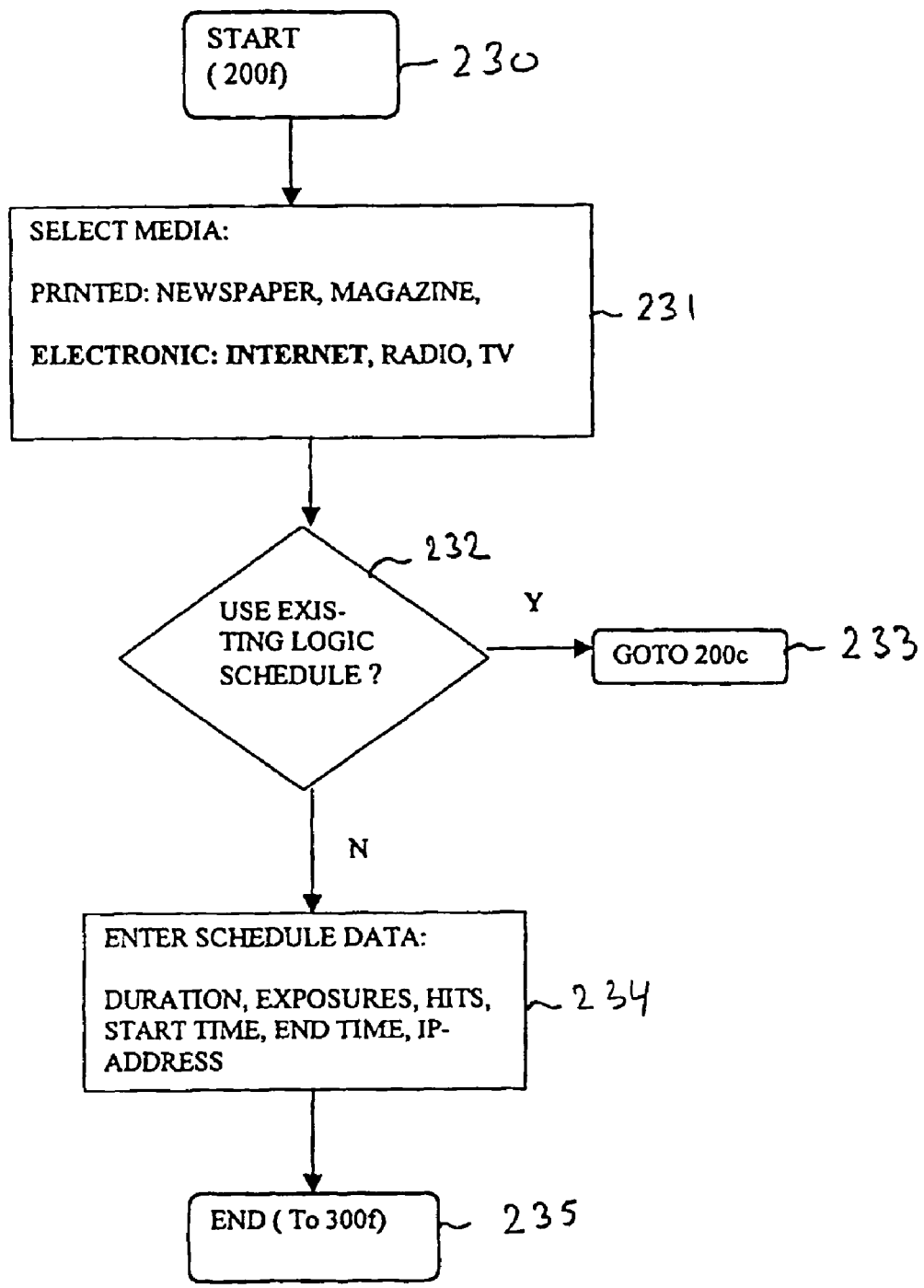
Figure 10:
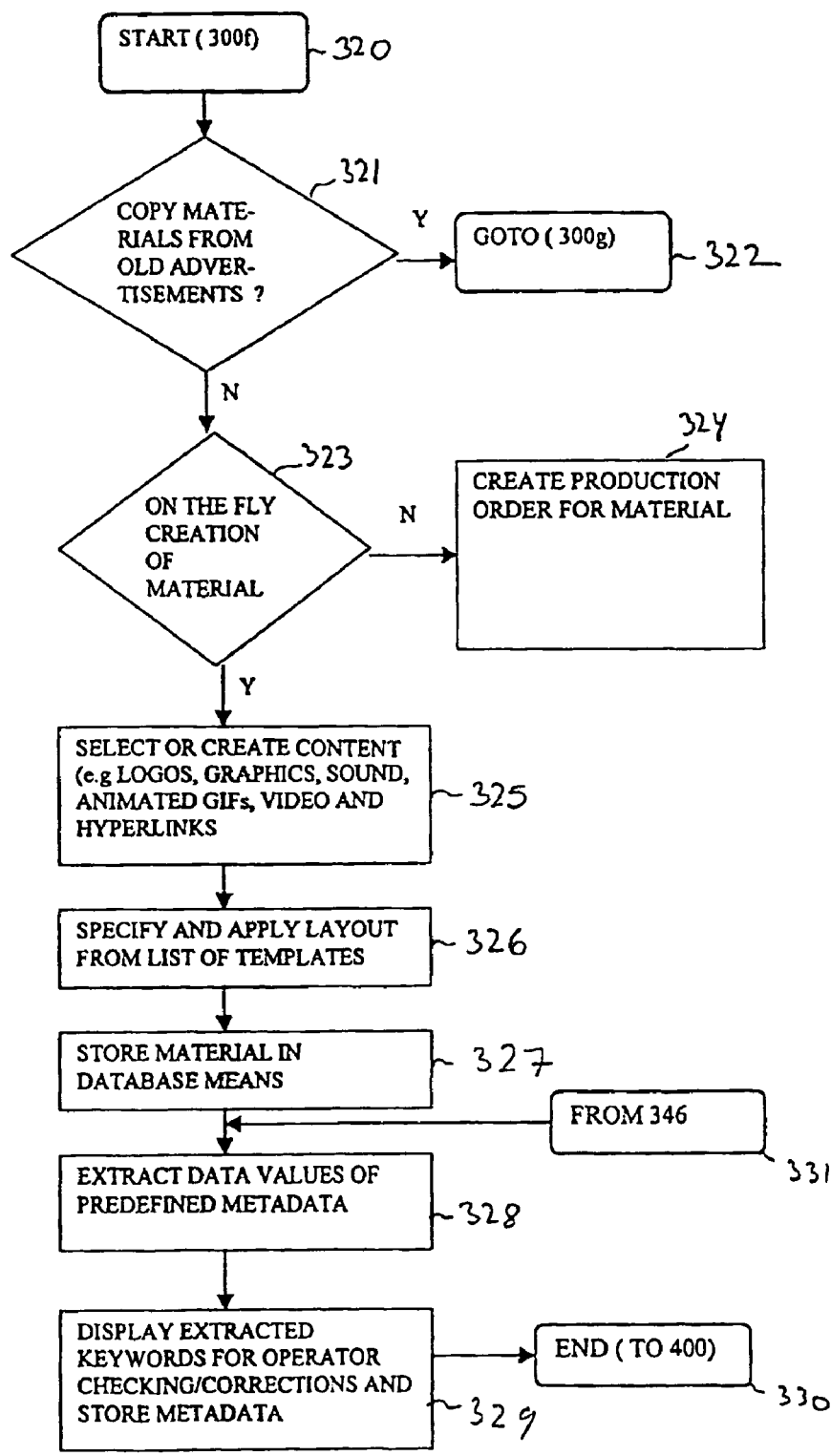
Figure 11:
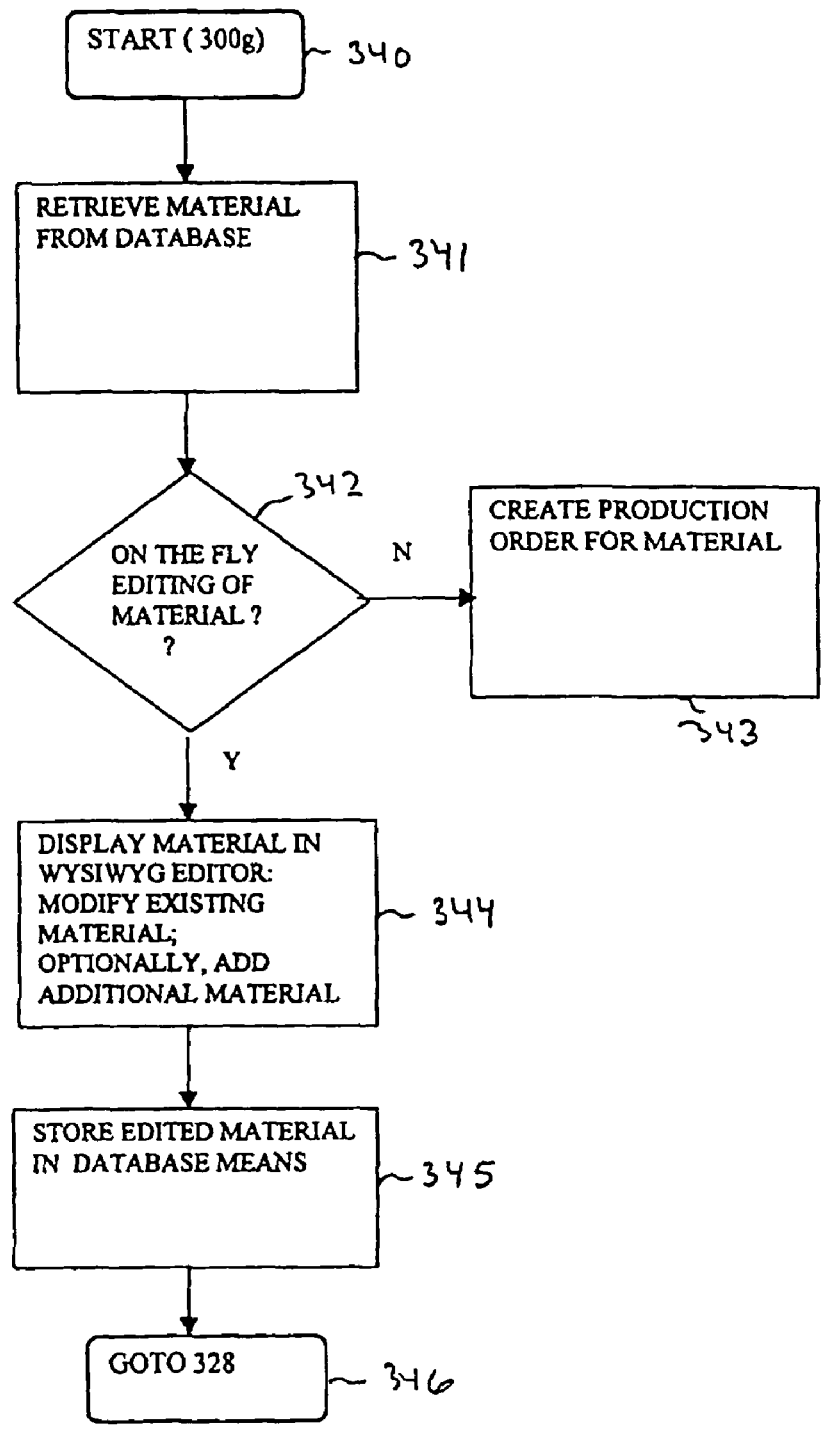
Figure 12:
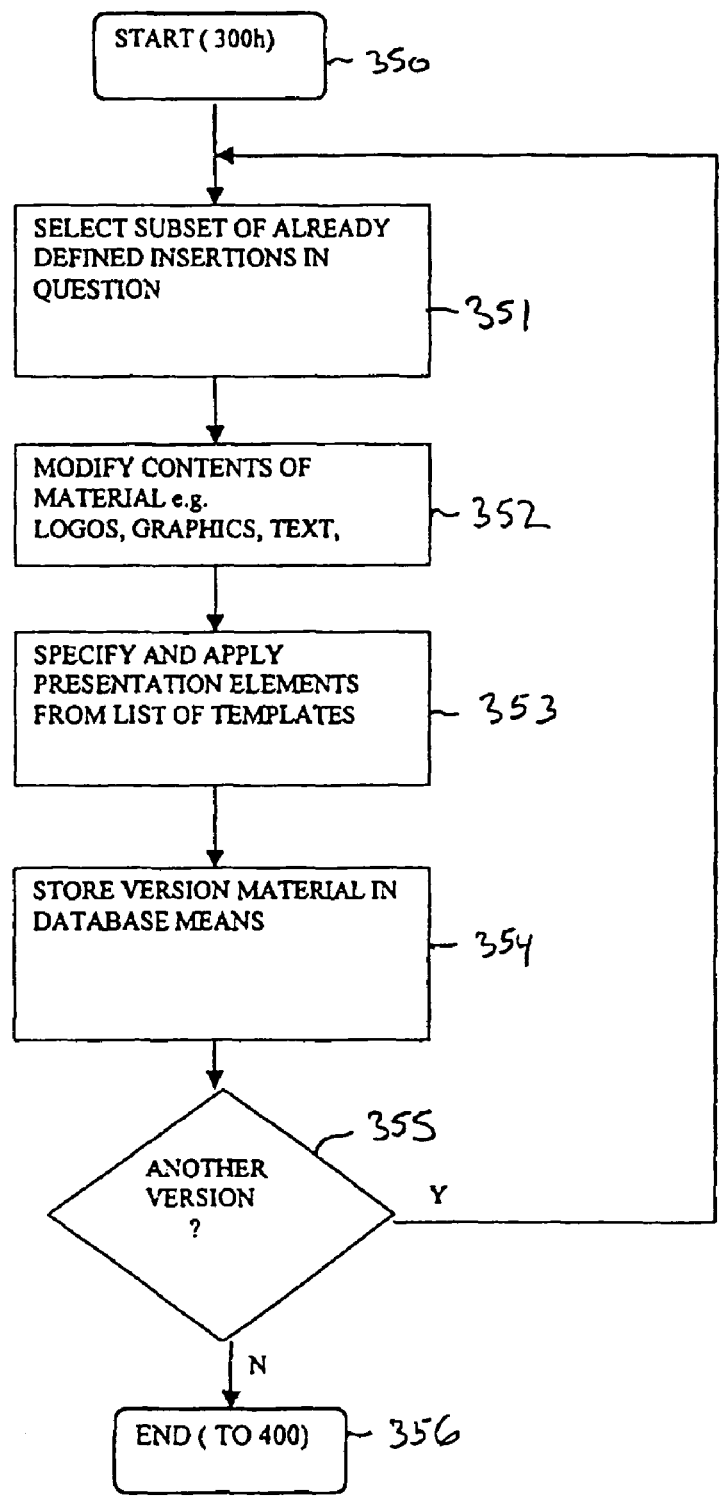

FIGS. 5, 6 and 7 illustrate the process steps required to enter the newspaper advertisement while FIGS. 9 and 10 in combination with FIG. 7 illustrate an additional number of steps that are required to enter the Internet advertisement. FIGS. 8, 11 and 12 illustrate processes that may be called from one or several of the processes illustrated in FIGS. 5, 6, 7, 9 and 10 depending on whether the operator prefers to copy and edit previously stored logic schedules and material of the advertisements or her/she prefers to create the same from scratch.

Figure 3:
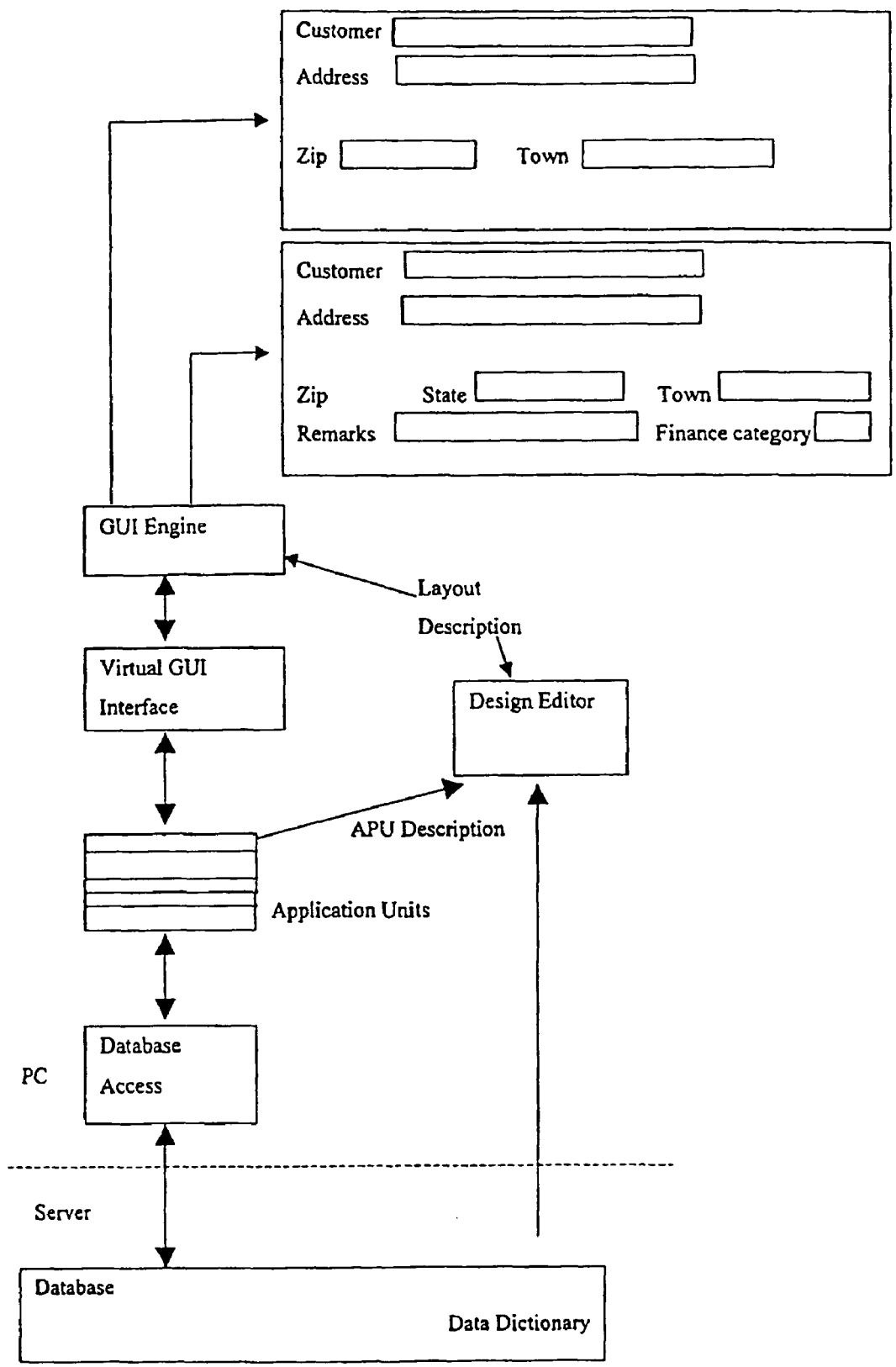
FIG. 3 illustrates a multi-layered model of a system architecture of a preferred embodiment of the advertisement sales and management system.
Figure 4:
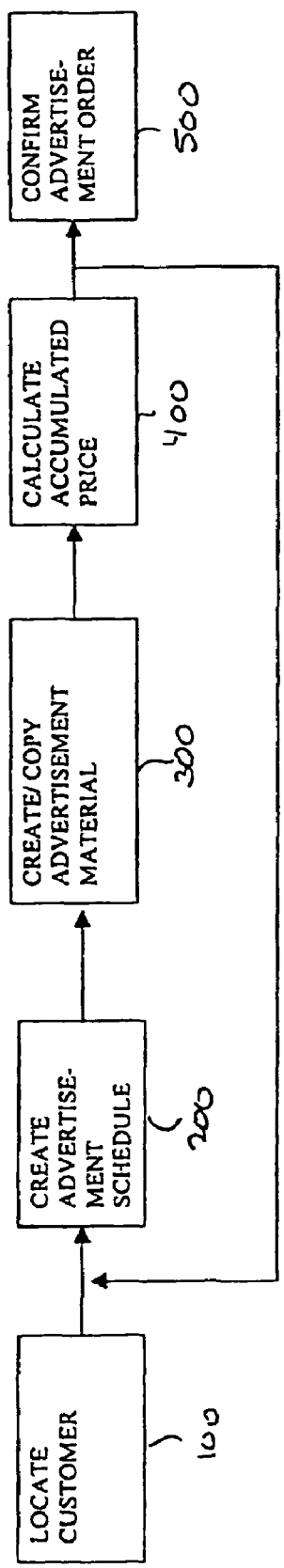
FIG. 4 is a top-level flow chart of five processes that implement a complete advertisement order booking/creation process.

FIG. 4 illustrates a top-level workflow of the advertisement booking procedure comprising five booking processes 100, 200, 300, 400, 500 which implement a complete booking procedure of an advertisement order in accordance with a preferred embodiment of the invention. In process 100, a workstation operator or operator located at one of the client workstations 16 or 17 receives an advertisement order through e.g. a phone dialog, mail, e-mail, fax etc. By entering relevant customer data into one or more of entry fields defined on the workstation screen by a graphical user interface (GUI) (as illustrated on FIG. 3) an already existing customer can rapidly be identified in the database. Alternatively, if the customer is new, the workstation operator is prompted to enter required customer data before proceeding to process 200.

In process 200, advertisement booking data relating to one or several schedules that define(s) one or several sets of insertions of a single advertisement, or of a group of related advertisements, are entered and subsequently stored within the database. Additionally, a number of preferably media specific attributes are entered for each insertion of the one or several related advertisements which is/are in the process of being booked, scheduled and stored within the database in this step. The entry of the advertisement booking data is optimized by means of both visual aids such as calendars showing the structure of advertisement bookings and related insertions as well as by easy access to information such as packages, product information, classifications, etc. This information is preferably selected from predefined lists either by means of keyboard shortcuts or by the use of a computer mouse. The order entry module also accommodates different types of sales calls such as volunteered advertisements, canvassed advertisements and customer inquiries.

In process 300, material associated with the advertisement or the group of related advertisements is created/edited and subsequently stored within the database. According to the present embodiment of the invention, the material associated with each advertisement comprises contents of the advertisement and presentation elements of the advertisement. This material defines a visual and/or audible appearance of the advertisement when published in a media. In process 400, an accumulated price of the current advertisement order is calculated and displayed on the operator's workstation screen, thereby allowing the operator to inform the customer of the current price of the advertisement order. After process 400 has been completed, another advertisement of the group of related advertisements (in the present example, two related advertisements) in the advertisement order may be booked in the database by following the route of arrow 510 back to process 200. Alternatively, the booking process of the advertisement order can be terminated by jumping to process 500 wherein a detailed order confirmation form is generated and transmitted to the customer of the advertisement order by fax, mail, e-mail or in any other suitable format according to the customer's preference. The detailed level of information supported by a WYSIWYG editor allows the customers to be presented with a single confirmation form that covers all the information concerning an advertisement booking such as pricing, discount information, presentations, media, zoning, etc. The customer can be provided with an order confirmation sent as an e-mail through e.g. e-mail server 50 of FIG. 1 with automatically attached files based on the booking information (e.g. a PDF proof of a printed advertisement), or as a printed proof including advertisement booking information and sent by regular mail. An order confirmation may also be provided by fax in which case a printed proof can be used. Alternatively, a fax can electronically be sent from the operator's workstation or through a general fax input/output system 35 of FIG. 1.

FIG. 5 shows in more details a number of steps performed in process 200 of FIG. 4. At step 202 the workstation operator is prompted to select a first media wherein a first advertisement of the group of related advertisements should be booked. These media may be organised into two different groups: a printed media group and electronic media group. The printed media group preferably comprises media such as newspapers, magazines, books etc. while the electronic media group preferably comprises media such as the Internet, radio, TV etc. An entry screen defined by the GUI in step 202 prompts the operator to select a particular medium. When the particular medium has been selected, in the present example a newspaper medium, the operator is prompted in step 203 to choose between using an already existing logic schedule as a basis for creating the new schedule by jumping to step 200c or alternatively jump to step 205 wherein a new schedule can be entered. Preferably, the GUI is adapted to display a schedule entry form in a format which is customised to that particular medium which was selected in step 202. In the illustrated example, the schedule data prompted for by the GUI such as a title of the specific newspaper (e.g. "Morning Star") including zones, classifications, sections, publication dates etc. are typically relevant for newspaper advertisements. Table 2 below gives an example of how two sets of schedule data, i.e. data corresponding to items 81 & 82 of the newspaper advertisement of the order structure in FIG. 2, could be defined in the present system:

TABLE 2

| Title | Zone | Classification | Section | Logic schedule | Publication dates | Material version |
|---|---|---|---|---|---|---|
| Morning Star | East | RealEstate | A | 4× | Apr. 3, 1999, Apr. 11, 1999, . . . | Ver. 1.0 & 1.1 |
| Evening Star | Vest | Buildings | B | 2× | Apr. 3, 1999, Apr. 11, 1999 | Ver 2.0 |

Two schedules associated with the advertisement have been created/defined in step 205, the first schedule defining four insertions of the advertisement in a specific newspaper on consecutive weekdays and a second schedule defining two insertions of the advertisement in another specific newspaper. This capability that allows an operator to, during a single processing step, step 205, define a number of schedules in differing printed media is a very convenient feature of the present embodiment of the invention. For example, the above-described single booking procedure allows the operator to rapidly create schedule data for that plurality of schedules that are commonly found in connection with sales campaigns. Such sale campaigns will often run in several different newspaper species and diverse electronic media at the same time.

The schedule(s) for the particular medium typically defines a number of insertions of the advertisement. Each insertion is furthermore associated with a material data level which is associated with the advertisement contents and advertisement presentation elements so that the material of each insertion defines a specific visual and/or audible appearance of the advertisement when published. This order structure is illustrated in FIG. 2. With reference to the exemplary schedules shown in table 2, the first schedule defines four insertions of the newspaper advertisement in the "Morning Star" at the respective publication dates. The four insertions are in the present example associated with two versions of material, version 1.0 and version 1.1 so that e.g. the two earliest insertions are associated with material 1.0 and the two later insertions are associated with material 1.1. Accordingly, since the material defines the specific visual and/or audible appearance of the advertisement when published, the two earliest insertions of the advertisement will be identical in terms of visual appearance in the newspaper but different from the two later insertions of the advertisement. The second schedule defines two insertions of the newspaper advertisement in another newspaper, the "Evening Star", at two respective publication dates. Material version 2.0 is associated with both of these insertions of the advertisement and consequently will the visual appearance of these insertions, in this case, be different from any of the insertions of the advertisement in the "Morning Star". Naturally, all of the insertions of the advertisement could be associated with different material or the material could be identical, as defined by the version number.

After the schedule or schedules of the advertisement has/have been created and stored in step 205, the operator is prompted to enter various advertisement associated data such as data relating to or defining the advertisement catch-line, creator, creation time, information notes etc. in step 206. These data are subsequently stored as a number of corresponding attributes of the advertisement in the database. After step 206 has been completed, program control is transferred to step 207 that jumps to step 301 of process 300 illustrated in FIG. 6.

In process 300, the material, i.e. contents and presentation elements, of the advertisement or the material of each of the advertisements of the group of related advertisement is created/defined. In step 302 the operator is prompted to either retrieve material of old advertisements stored in the database or to start creating, or at least order, the material of the advertisement. If the operator prefers to retrieve and edit material from old advertisements, program control is transferred to step 300g and the associated process, see FIG. 11. If the operator, one the other hand, prefers to start create the material he/she may, at step 304, choose to either specify and order the material from a production department in step 305 or go to step 306 wherein the material may be created/defined on the fly. A production order for material is typically required in situations wherein the operator cannot finish the advertisement during the booking process because a number of more sophisticated application programs must be used. The operator may then pass on any material, which already has been created, to an advertisement planning and/or production system (25 on FIG. 1) utilised within a production department. The production department can subsequently complete the job by using standard DTP applications such as QuarkXPress®, Multi-Ad creator, etc. for advertisement production. Accordingly, a combination of steps 305 and 306 may also be applied in situations wherein the operator is capable of creating a part of the material.

In step 306, the operator is preferably creating/defining the advertisement's material with the assistance of the WYSIWYG editor which is a fully integrated part of the system. The WYSIWYG editor provides an efficient tool for creating or editing complete lineage advertisements or semi-display advertisements and/or for writing text blocks. The operation of the WYSIWYG editor is covered in the paragraph "WYSIWYG editor" below. Where the contents, often comprising a group of content elements such as text, logos, hyperlinks, photos, artwork, sounds, have previously been created either on the fly by the operator (step 306), or by the production department or by a combination of both, a template defining presentation element is applied to the group of content elements in step 307 to define the advertisement's visual and/or audible appearance. The WYSIWYG editor allows the operator on-the-fly viewing and evaluation of the appearance of the advertisement. If required, the operator can edit the contents and/or the presentation elements of the advertisement until the visual/audible appearance meets the customer's requirements. When the creation of the advertisement's material has been completed, the material is stored in the database in step 308.

In step 309 the operator is prompted to select whether he/she wishes to create one or several versions of the advertisement just created in steps 306 and 307, and optionally step 305. If the answer is yes, control is transferred to process 300h illustrated in FIG. 12 and if the answer is no process control is transferred to process 400. In step 351 of process 300h, the operator is prompted to select a subset of the previously defined schedule or schedules of insertions of the advertisement (in step 205). As an example, a previously created schedule may have defined four insertions of the advertisement that all were associated with identical material in the newspaper "Morning Star. In step 351 the operator may now decide that the two last insertions of the advertisement in this schedule should be associated with different material to distinguish these insertions from the two first insertions. The material associated with the previous insertions of the advertisement is subsequently retrieved from the database in step 351 and displayed in the WYSIWYG editor. The operator may now edit the advertisement's existing content elements and/or presentation elements to create a new version of the advertisement in steps 352 and 353. Naturally, the operator is also allowed to add new content elements and/or presentation elements or remove the same to create the version of the advertisement. However, after the version of the advertisement has completed, its associated material can be stored in the database in step 354 and properly linked to the two insertions of the advertisement that were previously selected (in step 351). Accordingly, in the present example the two last insertions of the advertisement would be an another version of the advertisement than the version published in the two first insertions thereof, and consequently have a differing visual appearance.

In step 355 the operator is prompted to select whether he/she wants to create yet another version of the advertisement, and if the answer is yes, process control is transferred back to step 351. If the answer is no, process control is transferred to process 400. Consequently, since each version of the advertisement may be created by selecting suitable content elements and presentation elements from previously stored advertisement material, there is no need to define a completely new advertisement for each unique version of the advertisement. Thus, the process 300h provides the operator with a convenient tool which allows him/her to create one or several versions of the advertisement by simply selecting and editing existing contents and/or presentation elements stored in the database and associating the resulting material to appropriate insertions of the advertisement. Thus, resource-demanding data duplication can be avoided in the present system.

After the desired versions of the advertisement have been created, control is transferred from step 355 to step 356 and consequently to process 400 illustrated in FIG. 7. In step 402, a pricing module which is adapted to calculate the current price of the advertisement being created or calculating the accumulated price for a group of related advertisements in an advertisement order calculates a requested price based on stored database data related to price parameters such as the individual customer, the customer contract, the classification, the rate structure of the newspaper or other media, a special discount or rebate structure of the individual customer etc. Furthermore, the price of the advertisement(s) often varies according to parameters such as the advertisement type, the material of the advertisement, the package for which the advertisement is booked, the schedule(s) of the advertisement (which defines the insertions and versions of the advertisement), special requests for page and position, request for special colour usage, amount of special build up to be performed, use of logos, images and graphics as well as other properties assigned to the advertisement.

The fundamental equation that governs the price calculation is stated in step 403 as:

Advertisement Price=Basic Price+Surcharges−Discounts−Commission;

However, calculating the Basic Price is typically a quite complex task wherein the pricing module must access the previously mentioned price parameters in the database and apply them to a price model for the customer in question or, alternatively, use prestored standard rates to obtain the correct advertisement price.

The pricing module furthermore supports redefinition of individual pricing parameters as well as restructuring the way they are used. This makes it possible not only to use the price model that is currently valid, but also to use a past or future pricing of advertisements according to the price model that was or will be valid at a specific time. In spite of the complexity of the price parameters, it is transparent for both the operator and for the customer. Transparency is achieved in the present system by using detailed levels of calculation that makes it possible to follow the calculation as a number of totals for each of the various pricing parameters. The pricing module also supports multiple currencies, VAT calculation, possibility of calculating the price based on more than one customer (agency customer relations, split pricing relations), contract discount calculation, promotion discount calculation, agency commission calculation and rebate calculation.

After the current price of advertisement has been calculated in step 404 the operator is prompted in step 404 to choose whether he/she wishes to book another advertisement (in this example, the second advertisement) in the current advertisement order. If the answer is yes, process control is transferred to process 200f in step 405. If the answer is no, the accumulated price of the current advertisement order is displayed to the operator (in the present example this would be the price of those six previously defined insertions of the advertisement among two newspapers). If the price is agreeable for the customer, process control is transferred from step 407 to step 409 which exits the advertisement order creation process by jumping to step 500 wherein a detailed order confirmation is generated and transmitted to the customer as previously mentioned in connection with FIG. 4.

As previously explained, the customer also wishes to book Internet insertions of the advertisement and the booking process then proceeds as explained below. Process control is transferred from step 405 of FIG. 7 to process 200f illustrated in FIG. 9. Process 200f comprises processing steps that correspond to the previously mentioned steps in connection with process 200 of FIG. 5. In step 231 which corresponds to step 202 the operator is selects an electronic media for the current advertisement and selects the Internet as the specific electronic publication media of the advertisement. In step 232 the operator is prompted to select between retrieving and editing a previously created schedule or creating a new schedule. In step 234 the operator must enter schedule data in an entry form which is customised to the Internet media and displayed by the GUI. Schedule data relating to advertisement publication start time(s) and end time(s) or number of hits, an Internet address of customer or an Internet address for publication are preferably entered by the operator and subsequently saved in the data base. A reference is required to the customer's homepage if the completed Internet advertisement shall reference to the customer's homepage. In this often used scenario, the advertisement material of the Internet advertisement is stored in a proprietary data format of the database of the present advertisement sales and management system. The material must thus be converted from this proprietary data format to a format which is compatible with the customer's Internet Server and associated software. The advertisement material is typically converted to the HTML format or another page description language such as PDF, ASP etc. and transmitted to the customer, optionally as a part of the order confirmation procedure performed in process 500.

After the schedule has been entered, process control is transferred to process 300h illustrated in FIG. 10 wherein a material for the Internet publication of the advertisement is created and stored. In step 321 the operator is prompted to retrieve and edit previously stored material associated with old advertisements or start creating, or at least order, the material of the advertisement. If the operator prefers to retrieve and edit material from an old advertisement, program control is transferred to process 300g in step 322, see FIG. 11. If the operator prefers to start creating the material he/she may, at step 323, choose to either specify and order the material from the production department in step 324 or proceed to step 325 for on the fly creation of the material.

In steps 325 and 326, the operator may create/define the advertisement's material, preferably, with the assistance of the previously mentioned WYSIWYG editor. In the present example, advertisement material has previously been created during the creation of the corresponding newspaper advertisement. Accordingly, the most likely production route for the operator to follow, when prompted in step 321, would be to proceed to process 300g illustrated in FIG. 11 in order to utilise this advertisement material as a basis for the Internet advertisement. In step 341, the stored material of the corresponding newspaper advertisement is retrieved from the database and the operator is prompted in step 342 to choose whether he/she wishes to perform on the fly editing of the retrieved material or wishes to create a production order that specifies the required editing of the material. If the operator chooses to perform on the fly editing of the retrieved advertisement material, the WYSIWYG editor displays the material in step 344 and the operator may edit the existing material if he/she so wishes. This editing may be desirable due to particular requirements to the advertisement's Internet material that differs from the requirements to the newspaper material for providing a "nice" and readable computer display presentation of the advertisement. In step 345 the edited material is stored in the database and process control is transferred to step 328 of process 300f in FIG. 10.

In step 328 of process 300f, information of the advertisement is extracted by a software module which searches for keywords that correspond to data of a number of predetermined metadata fields. These software module preferably uses knowledge about the classification of the advertisement to recognise particular target word or phrases in the advertisement's text content. If the advertisement has been classified under cars, the software module would search for target words such as "miles", "brand", "colour", "year", "price" and corresponding data values of each of these target words so that each metadata field can be assigned the value of the extracted data value belonging to it. The extracted data values of these metadata fields are subsequently displayed to the operator in step 329 for manual inspection and error correction, if required. Finally, step 329 is completed after the extracted data values of these metadata fields have been stored together with the advertisement associated data that were stored in step 206. Process control is then transferred to processes 400 and 500 wherein the advertisement price is calculated and a detailed order confirmation transmitted to the customer. In the present example, the advertisement order is now complete and the operator is ready to receive and book the next advertisement order starting over from process 100 and so forth.

WYSIWYG Editor

As previously described, the present embodiment of the advertisement sales and management system comprises a fully integrated WYSIWYG editor. The WYSIWYG editor is first of all a fast and efficient tool for creating or editing complete lineage advertisements or semi-display advertisements and/or for writing text blocks that are passed on to the production system and used in the advertisement make-up process. The WYSIWYG editor may include access to a number of predefined advertisement templates (standard advertisements) that can be used as the basis for fast building of semi-display advertisements. Accordingly, the WYSIWYG editor allows on the fly completion of advertisements, such as classified lineage advertisements, semi-display advertisements, etc. or to create text input to an advertisement production department while taking the advertisement order. In addition, the advertisement system preferably provides features that are adapted to receive customer service-associated data from the server 10 of FIG. 1, thus enabling viewing previously entered information on a customer simultaneously with taking an advertising order. Preferably, a selection of previously built advertisements for the customer in question is available. The operator may use a split screen to view these advertisements and, further, use a drag and drop feature provided by the editor to copy a previously built advertisement or parts of it.

Additional supporting features or tools may also be provided such as a collection of standard shapes, logos, images and graphics and a collection of frame styles previously used by the customer in question and from which he/she may choose. This selection may be available as thumbnail presentations that can be sorted according to classification or seasonal/theme related events. Accordingly, the WYSIWYG editor allows operators to build or make up advertisements in a true WYSIWYG fashion while talking to the customer.

During the advertisement building, the system may dynamically send advertisement-associated information, such as word and line count, use of logos, use of frames, use of special typeface, use of colour, etc. to another program or module operating as a pricing engine i.e., a program dynamically calculating the current cost of the advertisement under creation. By displaying this cost information on the operator's screen, the operator will be able to continuously inform the customer about the current cost of an advertisement. This pricing engine may be running on the server 10 or alternatively, on one or more of the client workstations 15-20.

The word processing is, in this preferred embodiment of the invention, an implementation of Microsoft Word® that allows the workstation operators to enter complete lineage advertisements that require no further or only limited make-up. This word processing system may be used for spell checking and thesaurus and for simple text entry, which can be passed on to a production module as text blocks and used in the further make-up process. Hyphenation and justification is handled automatically by a suitable module.

In case a customer requests a specific positioning of an advertisement, the operator can, as part of the order entry process, easily get access to tentative advertisement positioning (space reservations) as well as already confirmed advertisement positioning (space bookings). The space reservation module includes a specific page, position, colour and size of an advertisement. The media publisher can, in expectation of a later arriving booking confirmation, reserve a specific space for a customer.

The space-booking module controls the confirmed bookings as well as the reservations that are temporarily placed for a given publication. Every advertisement booking is compared to the planned publication. If any deviations between the advertisement booking and the planned publication are identified, they will be evaluated and reacted upon to notify relevant users of the possible conflicts. Throughout the advertisement entry process the operator may be provided with relevant up-sell and down-sell prompts (e.g. a visual aid to the operator to enable him or her to sell more effectively) to assist the user in the dialog with the customer. The sales prompts are based on easily definable rules and parameter-driven tables that can easily be modified by the advertising staff without any technical assistance.

Invoicing

The present embodiment of the advertisement sales and management system comprises an invoicing module which generates the detailed information needed for invoicing. This information can also be passed on to a third party invoicing and accounts receivable system. The normal invoicing period may be a batch process initiated once a month, once a week, once a day, or according to the interval required by the individual publisher as the normal invoicing period.

Invoicing involves a number of operations such as: generating financial information is based on customer details, advertisement details, insertion details, price calculation details and various other details set up by the system. Based on the generated financial details the physical (printed) documents are created.

Information about Customers and/or Agencies—Account Balances

In the present embodiment of the advertisement sales and management system, the account balances are viewable, e.g. for checking the credit limit. The accounts receivable system may be used as a master for this balance information and an interface is supported from the system to the accounts receivable system and vice versa.

In the preferred embodiment of the invention, there is a tight integration between the advertisement sales and management system and other systems used in the environment (e.g. advertisement production and planning systems, editorial systems 30, fax 35, electronic funds transfer 40, automatic call distribution (ACD), archive 45, etc). Standard APIs and integration tools may also be provided in order to facilitate such integration tasks or the integration of any other third party products.

Accounts

All customers and/or agencies registered in the system are preferably related to one or more accounts. The customer record includes all customer specific information, such as name, customer ID, address, etc. whereas the account record includes the financial information such as terms of payment, credit limits, etc. A customer has more accounts if it has different financial terms for different activities. A customer can be part of a group of customers. The relations between the customers within the group are reflected in a many-layered hierarchy. This is used for representing the relations between, e.g. corporate offices, subsidiaries and branch offices. The ability to create and easily maintain the complex structure of a large number of customers and/or agencies and their belonging accounts as well as the relations between the various customer groups are an essential part of the system. A hierarchical structure of customers and accounts is preferably used, thereby eliminating redundant information (i.e. data duplication). This reduces time spent on maintenance and ensures that debtor records are not fragmented but linked to a single point. Every advertisement order is based on customer and account information. The design of the system ensures that all customer information only has to be entered once into the system. Similarly, changes to the information are corrected only once independent of the number of times the information is used. When creating a new customer or account, the system preferably provides functionality that easily validate the entered information, e.g. by taking into account the many postal codes and address standards used in different countries.

Search Functions

In order to make it easy to identify a customer or account, extensive search functionality is also available in the present embodiment of the advertisement sales and management system. When the correct customer or account is located, the user has access to an advanced contract module. A contract is a commitment by one or more customers and/or agencies to place a certain amount of advertising with a newspaper and/or other media publisher over an agreed period of time in return for a fixed or variable discount or rebate. The contract module provides functionality to easily create and maintain contracts covering classified advertisements, retail advertisements, multiple products (e.g. print and online), as well as multiple customer accounts. The contract module also makes it easy to specify or change the criteria that have to be met in order to fulfil a contract's obligations. Managers or relevant users among the sales staff may be automatically notified when contractual obligations are not met or when the expiration of a contract is pending.

Customer Service Module

A customer service module used for registration of complaints from customers and/or agencies may also be included in the present embodiment of the advertisement sales and management system. Apart from the registration of complaints the customer service module handles the actions which have to be taken in order to solve the problems as well as the follow-up tasks and the possible credits which the customer may obtain. The module also provides access to past information on the customers and/or agencies.

Information about Payments

In the present advertisement system it may be possible to view whether certain items have been paid or not together with a list of the payments made by the individual customer. The handling of payments, interest calculation and reminders are done by the accounts receivable system. Prepayments are handled separately to avoid invoicing the customer twice, and are based on an interface with the accounts receivable system. Some changes to advertisements or the pricing structure may have an impact on already invoiced (and perhaps even paid) advertisements. The system may comprise means to handle these kinds of problems, such as means to manage the issuance of credit notes or of additional invoices.

Sales Force Automation

Sales force automation tools are made generally available in the present embodiment of the advertisement sales and management system to support and ease the work of a sales staff associated with advertisement bookings and sales in a medium or media. These tools are tightly integrated with the data of the rest of the system as well as with the external systems through which activities with contacts and colleagues are made (e.g. the telephone system, the fax system 35 or e-mail system 40.) In this way data duplication is avoided and it is possible to update schedules or activity lists and to initiate and record telephone, fax or e-mail calls.

Contact Manager and Activity Manager

The contact manager module allows the creation and easy maintenance of structured relationships between customers and/or agencies, accounts and advertisement bookings. Furthermore, it is possible to perform automatic dial-up, fax and e-mail functions directly from the contact manager. The activity manager module includes extensive task administration and calendar functionality for the sales staff. It also provides automatic journal functionality that records all phone call, e-mail and fax operations relating to a contact. In this way the activity manager keeps track of all interaction with contacts, both scheduled and historical.

Target Manager

The target manager module assists the sales staff in selecting the proper target group for canvassing or for special promotions and sales campaigns. By means of a highly customisable interface, the target manager assists in selecting a target group among the potential customers and/or agencies in the database 5. This can be on the basis of criteria such as geographical location, business type, etc. When a target group has been identified an appropriate type of activity is selected. Among the activities, which the target manager may support are direct mail campaigns where letters are printed based on a template document containing automatically inserted customer information, or e-mail campaigns where e-mails automatically are sent to the target group.

Other activities are call sheets where a selected group among the sales staff will be presented with a number of tasks in their respective activity manager. These tasks contain links to the contact manager and hereby the sales staff can retrieve the required information to fulfil the phone call which, in return, will be added to the journal of the (potential) customer.

Management of Special Promotions and Campaigns

In the present advertisement sales and management system it is also possible to select sets of customers for canvassing and assign them to a campaign. Every campaign has a unique identity. Any activity related to that campaign are recorded and monitored in order to follow up on the results. The canvassing module is tightly integrated with the other sales tools. It is also possible for the media publishers to define marketing campaigns, which do not involve any specific scheduled contact between sales people and customers and/or agencies and to measure the effectiveness of campaigns by analyzing advertising trends during and immediately after the campaign.

Offline Sales Tools

Due to the basic system design where a fat client holds many of the standard data and functionality, the external sales staff can, without connection to the main servers, still enter into a dialog with a potential customer based on information downloaded to the local workstation prior to the sales call. Another option is to connect to the main servers from the customer's location.

Remote Advertisement Entry

The present advertisement system provides several different ways of entering advertisements and advertisement bookings. As for the external sales staff, certain customers and/or agencies can also be granted remote access (although restricted) to the advertisement system. This customer access may range from very limited access that only allows customers and/or agencies to monitor their current activities to very complex booking options where the customer can book new advertisements or deliver completed advertisements or required electronic material for the advertisement building. The advertisement system also provides a standard API, which enables the establishment of Internet access for real time order entry, Internet advertisement pricing, etc. Any advertisement order received from the Internet or any other external source is created and stored in the system exactly as if it had been created by the in-house sales staff. Orders and advertisement content may either always, or based on parsing of the advertisement order or content be routed to internal sales staff for control or delay routing for credit checking.

Box Office—Confidential Box

The purpose of the box office module is to allow a customer to remain anonymous, if he/she prefers so. In order to do so, the advertisement does not contain the customer's name, address, telephone number or anything, which can identify the advertiser as a person. Instead, the advertisement contains a so-called box number, which people can respond to, i.e. send or phone a response to the newspaper with references to the relevant box number. The box office module in the system supports all the manual functions such as collecting and forwarding replies to the customer. The forwarding of replies includes the set-up of a number of standard letters where a number of attributes (e.g. customer name, address and number of replies) are automatically inserted.

The box office module may support at least the following types of boxes:

A "virtual" box where the replies are sorted by the staff and manually forwarded by mail to the customer.

A physical box at the publisher's premises where the customer can collect his or her mail.

A voice mail system where the customer can rent the voice mail box, and hence have access to the replies over the phone.

Reports and Statistics

The advertisement sales and management system according to the present embodiment has been built to be an advanced and up-front information system for all user or operator groups at large media publishing houses. As such, the system provides a complete information profile on each customer, printed or electronic publication, product, etc. One of the most important demands from media publishers today is to be able to learn from experience. The present system supports these requirements by storing all information at a very detailed level, enabling automatic data analysis. This information can be used for serving customer market demands in an optimum way. As the system keeps all information at a very detailed level, it provides the possibility of making reports and statistics on almost any level of details. Some reports include full specification whereas others only include the totals for a limited period of time. Reports and statistics can be run on the screen or printed depending on the requirements of the individual user. The key point is that, if required, the users themselves can easily generate the reports and statistics.

The invention claimed is:

1. An advertisement sales and management system comprising:
   (a) data storage means;
   (b) data retrieval means;
   (c) data processing means;
   (d) database means; and
   (e) a number of workstations, one or more of the workstations being adapted to perform one or more of tasks selected from a group consisting of:
      (i) entering advertisement orders into the database means;
      (ii) entering advertisement-associated data into the database means and retrieving advertisement-associated data from the database means;
      (iii) entering customer-associated data into the database means and retrieving customer-associated data from the database means,
   the database means and the data processing means being adapted to at least store, and manage data relating to:
   (f) an advertisement customer;
   (g) an advertisement order comprising data related to an advertisement or a group of related advertisements including:
      (i) a medium or media in which the advertisement or individual advertisement of the group of related advertisements is/are to be published
      (ii) a schedule or schedules defining insertions of the respective advertisements in respective media to control publication of the respective advertisements;
      (iii) contents of respective advertisements;
      (iv) presentation elements of respective advertisements, the advertisement sales and management system being adapted to generate data defining the advertisement or the groups of related advertisements on the basis of entered order data, the advertisement sales and management system thereby constituting a single system supporting entry, sales and management of several related advertisements in several media based on entry of a single advertisement order, a WYSIWYG editor adapted to support entering or editing contents and/or presentation elements of the advertisements, the WYSIWYG editor being adapted to display, on a screen of at least one workstation of the system, the contents and presentation elements in the graphical representation defined by the data, and data transferring means for communicating advertisement data from the database means to a file, the system or database means associated with an advertisement planning and/or production system.

2. An advertisement sales and advertisement system according to claim 1, wherein the data transferring means is selected from the group consisting of:
   (a) address pointers;
   (b) serial or parallel databusses;
   (c) telephone networks;
   (d) LANs;
   (e) WANs; and
   (f) public networks including the Internet.

3. A method of managing advertisements in an advertisement sales and management system which comprises:
   (a) data storage means;
   (b) data retrieval means;
   (c) data processing means; and
   (d) database means; and
   (e) a number of workstations,
   the method comprising the steps of:
   (A) entering advertisement orders into the database means;
   (B) entering advertisement-associated data into the database means and retrieving advertisement-associated data from the database means;
   (C) entering customer-associated data into the database means and retrieving customer-associated data from the database means;
   (D) managing and storing by the data processing means and the database means, data relating to:
      (a) an advertisement customer;
      (b) an advertisement order comprising data related to an advertisement or a group of relating advertisements, including:
         (i) a medium or media in which the advertisement or individual advertisement of the group of related advertisements is/are to be published; and
         (ii) a schedule or schedules defining insertions of the respective advertisements in respective media to control publication of the respective advertisements;
         (iii) contents of respective advertisements;
         (iv) presentation elements of respective advertisements,
   (E) generating data defining the advertisement or the group of related advertisements based on entered order data in the advertisement sales and management system,
   the method thereby supporting entry, sale and management of several related advertisements in several media based on entering a single advertisement order, wherein the method further comprises the step of associating a material with substantially each insertion of the advertisement, the material comprising:
   (a) contents of the insertion of the advertisement; and
   (b) presentation elements of the insertion of the advertisement, thereby storing and managing substantially each insertion of an advertisement through a material data level provided by the association between the material and the substantially each insertion of the advertisement, the material defining the visual and/or audible appearance of the advertisement when published in a medium, and the method further comprising the steps of:
  (a) retrieving contents and/or presentation elements associated with a previously stored insertion of the advertisement from the database means;
  (b) creating a version or versions of the previously stored advertisement by editing the retrieved contents and/or presentation elements; and
  (c) storing the version or versions of the advertisement in the database means as corresponding material or materials.

4. A method according to claim 3, further comprising the steps of displaying and editing in a WYSIWYG editor, on a screen of at least one workstation, the retrieved contents and/or presentation elements associated with the previously stored version of the advertisement.

5. An advertisement sales and management system comprising:
  (a) a database structure for data storage and retrieval;
  (b) a computer processing system operable to access the database structure, and
  (c) at least one workstation coupled in communication with the processing system for inputting data thereto and receiving data therefrom,
  wherein said at least one workstation, in co-operation with said processing system and said database structure, is:
  (d) capable of entering one or more advertisement orders via the processing system into the database structure and retrieving one or more advertisement orders therefrom;
  (e) capable of entering advertisement-associated data into said database structure and retrieving advertisement-associated data therefrom; and
  (f) capable of entering customer-associated data into said database and retrieving customer-associated data therefrom,
  and wherein the database structure and the processing system are adapted to store and manage data therein relating to:
  (g) at least one customer associated with said one or more advertisement orders;
  (h) configuration data associated with each one or more orders concerning at least one group of related advertisements, such configuration data bearing information pertaining to:
    (1) media in which said at least one group of advertisements is to be published
    (2) at least one schedule defining at least one insertion of respective advertisements in respective media to control publication of said respective advertisements;
    (3) contents of said respective advertisements; and
    (4) presentation elements of said respective advertisements,
  the system being adapted to generate defining data identifying said at least one group of advertisements on the basis of said configuration data, and the system thereby supporting entry, sale and management of several advertisements in several media based on the entry of a single advertisement order,
  the system further comprising data transferring means for communicating advertisement data from the database structure to a file, the system or database structure being associated with an advertisement planning and/or production system.

6. A system according to claim 5, wherein the data transferring means is selected from a group comprising:
  (a) address pointers;
  (b) serial or parallel databusses;
  (c) telephone networks;
  (d) LANs;
  (e) WANs; and
  (f) public networks including the Internet.

7. A method of managing advertisement sales, the method comprising the steps of:
  (A) providing a database structure for data storage and retrieval;
  (B) providing a computer processing system operable to access the databases and
  (C) providing one or more workstations coupled in communication with the processing structure for inputting data thereto and receiving data therefrom,
  wherein said one or more workstations, in co-operation with said processing system and said database structure, are operable to execute the steps of:
  (D) entering via said one or more workstations, in co-operation with said processing system, one or more advertisement orders into the database structure and/or retrieving one or more advertisement orders from the database structure;
  (E) arranging for said processing system in co-operation with said database structure to be capable of entering advertisement-associated data into said database structure and retrieving advertisement-associated data therefrom; and
  (F) arranging for said processing system in co-operation with said database structure to be capable of entering customer-associated data into said database structure and retrieving customer-associated data therefrom, and, using said database structure and said processing system, storing and managing data in the database structure relating to:
  (G) at least one customer associated with said one or more advertisement orders;
  (H) configuration data associated with at least one group of advertisements such configuration data bearing information concerning:
    (i) media in which said at least one group of advertisements is to be published;
    (ii) at least one schedule defining at least one insertion of respective advertisements in respective media to control publication of said respective advertisements;
    (iii) contents of said respective advertisements; and
    (iv) presentation elements of said respective advertisements,
  the system being adapted to generate defining data identifying said at least one group of advertisements on the basis of said configuration data, and the system thereby supporting entry, sale and management of several advertisements in several media based on the entry of a single advertisement order,
  wherein the method further comprises the step of associating a material with substantially each insertion of the advertisement, the material comprising:
    (a) contents of the insertion of the advertisement; and
    (b) presentation elements of the insertion of the advertisement,
  thereby storing and managing substantially each insertion of an advertisement through a material data level provided by the association between the material and the substantially each insertion of the advertisement,
the material defining the visual and/or audible appearance of the advertisement when published in a medium, and the method further comprising the steps of:
(a) retrieving contents and/or presentation elements associated with a previously stored insertion of the advertisement from the database structure;
(b) creating a version or versions of the previously stored advertisement by editing the retrieved contents and/or presentation elements; and
(c) storing the version or versions of the advertisement in the database structure as corresponding material or materials.

8. A method according to claim 7, further comprising the steps of displaying and editing in a WYSIWYG editor, on a screen of at least one workstation, the retrieved contents and/or presentation elements associated with the previously stored version of the advertisement.

* * * * *